United States Patent
Yin et al.

(10) Patent No.: US 12,182,507 B2
(45) Date of Patent: Dec. 31, 2024

(54) TEXT PROCESSING MODEL TRAINING METHOD, AND TEXT PROCESSING METHOD AND APPARATUS

(71) Applicant: HUAWEI TECHNOLOGIES CO., LTD., Guangdong (CN)

(72) Inventors: Yichun Yin, Shenzhen (CN); Lifeng Shang, Hong Kong (CN); Xin Jiang, Hong Kong (CN); Xiao Chen, Hong Kong (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 363 days.

(21) Appl. No.: 17/682,145

(22) Filed: Feb. 28, 2022

(65) Prior Publication Data
US 2022/0180202 A1    Jun. 9, 2022

Related U.S. Application Data

(63) Continuation of application No. PCT/CN2020/102730, filed on Jul. 17, 2020.

(30) Foreign Application Priority Data

Sep. 12, 2019    (CN) .......................... 201910865963.0

(51) Int. Cl.
*G06F 40/216* (2020.01)
*G06F 40/166* (2020.01)
(Continued)

(52) U.S. Cl.
CPC .......... *G06F 40/216* (2020.01); *G06F 40/166* (2020.01); *G06F 40/279* (2020.01);
(Continued)

(58) Field of Classification Search
CPC .... G06F 40/216; G06F 40/279; G06F 40/166; G06F 40/30; G06F 40/117; G06F 40/20;
(Continued)

(56) References Cited

U.S. PATENT DOCUMENTS 10,134,425 B1 *  11/2018  Johnson, Jr. ............ G10L 25/87
10,706,873 B2 *   7/2020  Tsiartas ................ G10L 15/1822
(Continued)

FOREIGN PATENT DOCUMENTS

| CN | 107247989 A | 10/2017 |
|---|---|---|
| CN | 108764462 A | 11/2018 |

(Continued)

OTHER PUBLICATIONS

Sun Siqi et al: "Patient Knowledge Distillation for BERT Model Compression", Aug. 25, 2019 (Aug. 25, 2019), pp. 1-10, XP055960951.
(Continued)

*Primary Examiner* — Mohammad K Islam

(57) ABSTRACT

A text processing model training method, and a text processing method and apparatus in the natural language processing field in the artificial intelligence field are disclosed. The training method includes: obtaining training text; separately inputting the training text into a teacher model and a student model to obtain sample data output by the teacher model and prediction data output by the student model; the sample data includes a sample semantic feature and a sample label; the prediction data includes a prediction semantic feature and a prediction label; and the teacher model is a pre-trained language model used for text classification; and training a model parameter of the student model based on the sample data and the prediction data, to obtain a target student model. The method enables the student model to effectively perform knowledge transfer, thereby improving accuracy of a text processing result of the student model.

15 Claims, 15 Drawing Sheets

(51) Int. Cl.
*G06F 40/279* (2020.01)
*G06F 40/30* (2020.01)
*G06N 3/045* (2023.01)
*G06N 3/084* (2023.01)

(52) U.S. Cl.
CPC ............. *G06F 40/30* (2020.01); *G06N 3/045* (2023.01); *G06N 3/084* (2013.01)

(58) Field of Classification Search
CPC ......... G10L 15/02; G10L 15/16; G10L 15/22; G10L 25/21; G10L 25/84; G06N 3/04; G06N 3/08; G06N 3/45; G06N 3/084
See application file for complete search history.

(56) References Cited

U.S. PATENT DOCUMENTS

| | | | | |
|---|---|---|---|---|
| 11,003,568 | B2* | 5/2021 | Smith | G06F 11/0793 |
| 11,037,330 | B2* | 6/2021 | Bar-On | G06T 9/002 |
| 2015/0058004 | A1* | 2/2015 | Dimitriadis | G10L 25/78 704/233 |
| 2015/0242747 | A1* | 8/2015 | Packes | G06N 3/045 706/17 |
| 2016/0163310 | A1* | 6/2016 | Lee | G10L 15/19 704/232 |
| 2016/0284347 | A1* | 9/2016 | Sainath | G10L 15/16 |
| 2016/0379632 | A1* | 12/2016 | Hoffmeister | G10L 25/87 704/253 |
| 2017/0032244 | A1* | 2/2017 | Kurata | G06N 3/084 |
| 2017/0092268 | A1* | 3/2017 | Kristjansson | G10L 15/16 |
| 2017/0162194 | A1* | 6/2017 | Nesta | G10L 25/30 |
| 2017/0270919 | A1* | 9/2017 | Parthasarathi | G10L 17/06 |
| 2018/0268292 | A1 | 9/2018 | Choi et al. | |
| 2018/0365564 | A1 | 12/2018 | Huang et al. | |
| 2019/0051290 | A1* | 2/2019 | Li | G10L 15/063 |
| 2019/0205748 | A1 | 7/2019 | Fukuda et al. | |
| 2019/0378010 | A1* | 12/2019 | Morris | G06F 16/288 |
| 2019/0378498 | A1* | 12/2019 | Sainath | G06N 3/084 |
| 2020/0090682 | A1* | 3/2020 | Liu | G06N 3/08 |
| 2020/0251183 | A1* | 8/2020 | Kashefhaghighi | G16B 40/00 |
| 2020/0334538 | A1* | 10/2020 | Meng | G10L 15/16 |
| 2020/0334539 | A1* | 10/2020 | Wang | G06V 10/7784 |
| 2021/0012200 | A1* | 1/2021 | Lyske | G06V 10/82 |
| 2021/0142177 | A1* | 5/2021 | Mallya | G06N 3/084 |
| 2021/0201003 | A1* | 7/2021 | Banerjee | G06V 10/82 |
| 2022/0013105 | A1* | 1/2022 | Sharma | G10L 13/04 |
| 2023/0138491 | A1* | 5/2023 | Semenov | G06N 3/08 382/176 |
| 2023/0401831 | A1* | 12/2023 | Krishnan | G06V 10/776 |
| 2024/0127067 | A1* | 4/2024 | Bair | G06N 3/082 |
| 2024/0127806 | A1* | 4/2024 | Jordan | G10L 15/16 |

FOREIGN PATENT DOCUMENTS

| | | | | |
|---|---|---|---|---|
| CN | 109165738 | A | | 1/2019 |
| CN | 110135562 | A | | 8/2019 |
| CN | 110196894 | A | | 9/2019 |
| CN | 110210027 | A | | 9/2019 |
| CN | 110222707 | A | | 9/2019 |
| CN | 111539199 | B * | 8/2023 | ........... G06F 40/232 |
| CN | 116595881 | A * | 8/2023 | ............ G05N 3/084 |
| JP | 2016024759 | A | | 2/2016 |
| KR | 102609719 | B1 * | 9/2019 | .............. G06N 3/08 |
| WO | WO-2024019878 | A1 * | 1/2024 | ........... G06F 40/284 |

OTHER PUBLICATIONS

Kim Yoon et al: "Sequence-Level Knowledge Distillation", Jun. 25, 2016 (Jun. 25, 2016), pp. 1-11, XP055960945.
Freitag Markus et al: "Ensemble Distillation for Neural Machine Translation", Feb. 6, 2017(Feb. 6, 2017), pp. 1-5, XP055960948.
Gou Jianping et al: "Knowledge Distillation: A Survey", International Journal of Computer Vision, Jun. 9, 2020 (Jun. 9, 2020), pp. 1-30, XP055960959.

* cited by examiner

TEXT PROCESSING MODEL TRAINING METHOD, AND TEXT PROCESSING METHOD AND APPARATUS

CROSS-REFERENCE TO RELATED APPLICATIONS

This application is a continuation of International Application No. PCT/CN2020/102730, filed on Jul. 17, 2020, which claims priority to Chinese Patent Application No. 201910865963.0, filed on Sep. 12, 2019. The disclosures of the aforementioned applications are hereby incorporated by reference in their entireties.

TECHNICAL FIELD

This disclosure relates to the field of natural language processing, and more specifically, to a text processing model training method, and a text processing method and apparatus.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, the artificial intelligence is a branch of computer science, and is intended to understand essence of intelligence and produce a new intelligent machine that can react in a manner similar to human intelligence. The artificial intelligence is to study design principles and implementation methods of various intelligent machines, so that the machines have perceiving, inference, and decision-making functions.

With continuous development of artificial intelligence technologies, a natural language human-machine interaction system that enables human-machine interaction to be performed by using a natural language becomes increasingly important. The system needs to recognize specific meanings of a human natural language, to enable the human-machine interaction to be performed by using the natural language. Generally, the system extracts key information from a natural language sentence to recognize a specific meaning of the sentence.

Currently, an intelligent terminal usually has requirements for a deployed model, such as a model size requirement and a run time requirement. An existing pre-trained language model has a large quantity of parameters and a long inference time, and is difficult to meet a deployment requirement of the intelligent terminal. A knowledge distillation technology is a key technology that can implement miniaturization of a deep learning model to meet the deployment requirement of the terminal device. Compared with compression technologies such as quantization and sparsification, the knowledge distillation technology can achieve a purpose of compressing a model without specific hardware support. For example, in the field of natural language processing (NLP), the knowledge distillation technology may use a policy of teacher-student model learning. A teacher model may be a model that has a strong semantic representation capability and a large quantity of model parameters and that generally cannot meet the deployment requirement. A student model may be a model that has a weak semantic representation capability and a small quantity of parameters and that can be directly deployed on the terminal device. The student model is trained, so that the student model can learn to imitate behavior of the teacher model to perform effective knowledge transfer. In this way, the student model can have the same semantic representation capability as the teacher model.

Therefore, how to transfer a pre-trained text processing model (for example, a teacher model) to a miniaturized model (for example, a student model) by using an effective training method becomes a technical problem that needs to be urgently resolved.

SUMMARY

This disclosure provides a text processing model training method, and a text processing method and apparatus, so that a student model more accurately learns a semantic representation capability of a teacher model to implement effective knowledge transfer, thereby improving accuracy of a text processing result of the student model.

According to a first aspect, a text processing model training method is provided, including: obtaining training text; separately inputting the training text into a teacher model and a student model to obtain sample data output by the teacher model and prediction data output by the student model, where the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing; and training a model parameter of the student model based on the sample data and the prediction data, to obtain a target student model.

The model used for text processing may be a model used for text classification, or the model used for text processing may be a model used for text sequence tagging, or the model used for text processing may be a model used for text translation. It should be understood that the model used for text processing may be used for a natural language processing task. A specific implementation form of the model used for text processing is not limited in this embodiment of this disclosure.

It should be understood that the teacher model may be a model that has a strong semantic representation capability and a large quantity of model parameters, and the student model may be a model that has a weak semantic representation capability and a small quantity of parameters. Generally, because a quantity of parameters and a calculation amount of the teacher model are relatively large, the teacher model cannot meet requirements of an intelligent terminal for a model size, a run time, and the like of a deployed model.

In this embodiment of this disclosure, the student model may be enabled to continuously learn output data of the intermediate layer and the output layer of the teacher model, to avoid a problem that the student model only learns output data of the output layer of the teacher model, causing relatively low transfer efficiency, namely, relatively low accuracy of text processing by the student model. By using the training method in this embodiment of this disclosure, the student model can learn to imitate the output data of the intermediate layer and the output layer of the teacher model, so that the student model more accurately learns semantic representation of the teacher model to implement effective knowledge transfer, thereby improving accuracy of a text processing result of the student model.

With reference to the first aspect, in an optional implementation, the training a model parameter of the student model based on the sample data and the prediction data includes: training the intermediate layer of the student model based on the sample semantic feature and the prediction semantic feature; and training the output layer of the student model based on the sample label and the prediction label.

In this embodiment of this disclosure, a model parameter of the intermediate layer of the student model may be trained by using the sample semantic feature output by the intermediate layer of the teacher model and the prediction semantic feature output by the intermediate layer of the student model. A model parameter of the output layer of the student model may be trained based on the sample label output by the output layer of the teacher model and the prediction label output by the output layer of the student model. That is, in a process of training the student model, the student model may continuously fit the output data of the intermediate layer and the output layer of the teacher model, so that the student model more accurately learns the semantic representation capability of the teacher model to implement effective knowledge transfer, thereby improving accuracy of a text processing result of the student model.

In an optional implementation, a model parameter of an intermediate layer of the target student model may be obtained based on a deviation between the sample semantic feature and the prediction semantic feature by performing a plurality of iterations by using a back propagation algorithm.

In an optional implementation, a model parameter of an output layer of the target student model may be obtained based on a deviation between the sample label and the prediction label by performing a plurality of iterations by using a back propagation algorithm.

With reference to the first aspect, in an optional implementation, the teacher model and the student model are transformer models, the intermediate layer of the teacher model includes N transformer layers, and the intermediate layer of the student model includes M transformer layers; N is a positive integer greater than or equal to M, and the training the intermediate layer of the student model based on the sample semantic feature and the prediction semantic feature includes: selecting M transformer layers from the N transformer layers included in the teacher model, where each of the M transformer layers includes an attention mechanism module and a forward network module; and training an $i^{th}$ transformer layer of the student model based on a sample semantic feature output by an $i^{th}$ transformer layer of the M transformer layers of the teacher model and an attention score matrix in the attention mechanism module included in the $i^{th}$ transformer layer of the teacher model, where i is a positive integer less than or equal to M, and M is an integer greater than or equal to 1.

In an optional implementation, a quantity of transformer layers included in the teacher model may be greater than or equal to a quantity of transformer layers included in the student model.

In this embodiment of this disclosure, the student model and the teacher model may use a same model structure, so that the student model can more effectively imitate the output data of the teacher model, and the student model more accurately learns the semantic representation capability of the teacher model to implement effective knowledge transfer, thereby improving accuracy of a text processing result of the student model.

With reference to the first aspect, in an optional implementation, the training text is an enhanced text set, and the method further includes: performing partial word replacement on an obtained original text set to obtain a replacement text set; and obtaining the enhanced text set based on the original text set and the replacement text set, where each piece of training text in the enhanced text set includes label information, and the label information includes any one of information indicating a classification result of the training text, sequence tagging information, or text translation label information; and the classification result includes an emotion classification result of the training text or a semantic intention classification result of the training text.

In an optional implementation, the label information may be used to indicate the emotion classification result or the semantic intention classification result of the training text.

It should be noted that label information of any text in the original text set may be manually tagged label information, and label information of any replacement text in the replacement text set may be a predicted classification result of the replacement text, namely, predicted label information, which is obtained by inputting the generated replacement text into the teacher model.

In this embodiment of this disclosure, partial replacement may be performed on training text in the original text set to generate replacement text, to obtain a large amount of training text used to train a text processing model.

With reference to the first aspect, in an optional implementation, the performing partial word replacement on an obtained original text set to obtain a replacement text set includes: obtaining first text, where the first text is any text in the original text set; determining a replacement position of a word in the first text based on a replacement threshold of each word in the first text; masking one or more words at the replacement position to generate masked text; and inputting the masked text into a pre-trained language model to obtain replacement text of the first text.

With reference to the first aspect, in an optional implementation, the inputting the masked text into a pre-trained language model to obtain replacement text of the first text includes: inputting the masked text into the pre-trained language model to obtain the replacement text of the first text by using a greedy algorithm and/or a beam search algorithm.

In this embodiment of this disclosure, the replacement text obtained by using the greedy algorithm and/or the beam search algorithm is replacement text generated with reference to context information, so that the replacement text has smoother syntax and higher quality.

With reference to the first aspect, in an optional implementation, the training text includes the label information, the teacher model is obtained by training an initial teacher model with the training text, and before the training text is obtained, the method further includes: obtaining initial training text, where the initial training text does not include label information; separately inputting the initial training text into the initial teacher model and an initial student model to obtain an initial sample semantic feature output by an intermediate layer of the initial teacher model and an initial prediction semantic feature output by an intermediate layer of the initial student model; and training a model parameter of the initial student model based on the initial sample semantic feature and the initial prediction semantic feature, to obtain the student model.

In this embodiment of this disclosure, a general distillation process may be first used to perform general knowledge distillation based on a large-scale text corpus and a distillation algorithm of a transformer layer to obtain a miniaturized and pre-trained language model; then, a task-specific distillation process may be used, that is, more enhanced data may be obtained from an original data set by using a data enhancement module, and by using the enhanced data as data input of a knowledge distillation algorithm, knowledge distillation is performed based on the transformer layer to obtain the target student model with semantic representation similar to semantic representation of the teacher model and significantly fewer model parameters.

The label information includes any one of information indicating a classification result of the training text, sequence tagging information, or text translation label information. The classification result includes an emotion classification result of the training text or a semantic intention classification result of the training text.

The initial teacher model and the initial student model each include an input layer, one or more intermediate layers, and an output layer.

With reference to the first aspect, in an optional implementation, the initial teacher model and the initial student model are transformer models, the intermediate layer of the initial teacher model includes N transformer layers, and the intermediate layer of the initial student model includes M transformer layers; and the training a model parameter of the initial student model based on the initial sample semantic feature and the initial prediction semantic feature includes: selecting M transformer layers from the N transformer layers included in the initial teacher model, where each of the M transformer layers includes an attention mechanism module and a forward network module; and training an $i^{th}$ transformer layer of the initial student model based on a sample semantic feature output by an $i^{th}$ transformer layer of the M transformer layers of the initial teacher model and an attention score matrix in the attention mechanism module included in the $i^{th}$ transformer layer of the initial teacher model, where i is a positive integer less than or equal to M, and M is an integer greater than or equal to 1.

According to a second aspect, a text processing method is provided, including: obtaining to-be-processed text; and inputting the to-be-processed text into a target student model to obtain a processing result of the to-be-processed text, where the target student model is obtained by training a student model based on sample data and prediction data, the sample data is obtained based on training text and a teacher model, and the prediction data is obtained based on the training text and the student model; the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing.

The model used for text processing may be a model used for text classification, or the model used for text processing may be a model used for text sequence tagging, or the model used for text processing may be a model used for text translation. It should be understood that the model used for text processing may be used for a natural language processing task. A specific implementation form of the model used for text processing is not limited in this embodiment of this disclosure.

In an optional implementation, the target student model is a model used for text classification. In this case, a text processing result may be a text classification result. For example, the text classification result may refer to a user emotion classification corresponding to the to-be-processed text, or the classification result may refer to a user semantic intention corresponding to the to-be-processed text.

It should be understood that the teacher model may be a model that has a strong semantic representation capability and a large quantity of model parameters, and the student model may be a model that has a weak semantic representation capability and a small quantity of parameters. Generally, because a quantity of parameters and a calculation amount of the teacher model are relatively large, the teacher model cannot meet requirements of an intelligent terminal for a model size, a run time, and the like of a deployed model.

In this embodiment of this disclosure, the pre-trained target student model is obtained by continuously learning output data of the intermediate layer and the output layer of the teacher model, so that the target student model more accurately learns semantic representation of the teacher model to implement effective knowledge transfer, thereby improving accuracy of a text processing result of the target student model.

With reference to the second aspect, in an optional implementation, an intermediate layer of the target student model is obtained through training based on the sample semantic feature and the prediction semantic feature; and an output layer of the target student model is obtained through training based on the sample label and the prediction label.

In this embodiment of this disclosure, a model parameter of the intermediate layer of the target student model may be obtained by continuously training the student model based on the sample semantic feature output by the intermediate layer of the teacher model and the prediction semantic feature output by the intermediate layer of the student model. A model parameter of the output layer of the target student model may be obtained by continuously training the student model based on the sample label output by the output layer of the teacher model and the prediction label output by the output layer of the student model. That is, in a process of training the student model, the student model may continuously fit the output data of the intermediate layer and the output layer of the teacher model, so that the student model more accurately learns the semantic representation capability of the teacher model to implement effective knowledge transfer, thereby improving accuracy of a text processing result of the student model.

In an optional implementation, the intermediate layer of the target student model may be obtained based on a deviation between the sample semantic feature and the prediction semantic feature by performing a plurality of iterations by using a back propagation algorithm.

In an optional implementation, the output layer of the target student model may be obtained based on a deviation between the sample label and the prediction label by performing a plurality of iterations by using a back propagation algorithm.

With reference to the second aspect, in an optional implementation, the teacher model and the student model are transformer models, the intermediate layer of the teacher model includes N transformer layers, and the intermediate layer of the student model includes M transformer layers; each of the M transformer layers includes an attention mechanism module and a forward network module; a model parameter of an $i^{th}$ transformer layer of the target student model is obtained through training based on a sample semantic feature output by an $i^{th}$ transformer layer of M transformer layers of the teacher model and an attention score matrix in the attention mechanism module included in the $i^{th}$ transformer layer of the teacher model; and the M transformer layers of the teacher model are selected from the N transformer layers of the teacher model, where N is a positive integer greater than or equal to M, i is a positive integer less than or equal to M, and M is an integer greater than or equal to 1.

In this embodiment of this disclosure, the student model and the teacher model may use a same model structure, so that the student model can more effectively imitate the output data of the teacher model, and the student model more accurately learns the semantic representation capability of the teacher model to implement effective knowledge transfer, thereby improving accuracy of a text processing result of the student model.

With reference to the second aspect, in an optional implementation, the training text is an enhanced text set, each piece of training text in the enhanced text set includes label information, and the label information includes any one of information indicating a classification result of the training text, sequence tagging information, or text translation label information; the classification result includes an emotion classification result of the training text or a semantic intention classification result of the training text; and the enhanced text set is obtained based on an obtained original text set and a replacement text set, and the replacement text set is obtained by performing partial word replacement on the original text set.

It should be noted that label information of any text in the original text set may be manually tagged label information, and label information of any replacement text in the replacement text set may be a predicted classification result of the replacement text, namely, predicted label information, which is obtained by inputting the generated replacement text into the teacher model.

In this embodiment of this disclosure, partial replacement may be performed on training text in the original text set to generate replacement text, to obtain a large amount of training text used to train a text processing model.

With reference to the second aspect, in an optional implementation, the replacement text set includes replacement text of first text, the first text is any text in the original text set, and the replacement text of the first text is obtained by inputting masked text into a pre-trained language model; and the masked text is obtained by masking one or more words at a replacement position in the first text, and the replacement position is determined based on a replacement threshold of each word in the first text.

With reference to the second aspect, in an optional implementation, the replacement text of the first text is obtained by using a greedy algorithm and/or a beam search algorithm by inputting the masked text into the pre-trained language model.

In this embodiment of this disclosure, the replacement text obtained by using the greedy algorithm and/or the beam search algorithm is replacement text generated with reference to context information, so that the replacement text has smoother syntax and higher quality.

With reference to the second aspect, in an optional implementation, the training text includes the label information, the teacher model is obtained by training an initial teacher model with the training text, and the student model is obtained by training an initial student model based on an initial sample semantic feature and an initial prediction semantic feature; and the initial sample semantic feature is output data that is of an intermediate layer of the initial teacher model and that is obtained by inputting initial training text into the initial teacher model, the prediction semantic feature is output data that is of an intermediate layer of the initial student model and that is obtained by inputting the initial training text into the initial student model, and the initial training text does not include label information.

In this embodiment of this disclosure, a general distillation process may be first used to perform general knowledge distillation based on a large-scale text corpus and a distillation algorithm of a transformer layer to obtain a miniaturized and pre-trained language model; then, a task-specific distillation process may be used, that is, more enhanced data may be obtained from an original data set by using a data enhancement module, and by using the enhanced data as data input of a knowledge distillation algorithm, knowledge distillation is performed based on the transformer layer to obtain the target student model with semantic representation similar to semantic representation of the teacher model and significantly fewer model parameters.

Optionally, the label information may include any one of information indicating a classification result of the training text, sequence tagging information, or text translation label information. The classification result includes an emotion classification result of the training text or a semantic intention classification result of the training text. The initial teacher model and the initial student model each include an input layer, one or more intermediate layers, and an output layer.

With reference to the second aspect, in an optional implementation, the initial teacher model and the initial student model are transformer models, the intermediate layer of the initial teacher model includes N transformer layers, and the intermediate layer of the initial student model includes M transformer layers; each of the M transformer layers includes an attention mechanism module and a forward network module; a model parameter of an $i^{th}$ transformer layer of the initial student model is obtained through training based on a sample semantic feature output by an $i^{th}$ transformer layer of the initial teacher model and an attention score matrix in the attention mechanism module included in the $i^{th}$ transformer layer of the initial teacher model; and the M transformer layers of the initial teacher model are selected from the N transformer layers of the teacher model, where N is a positive integer greater than or equal to M, i is a positive integer less than or equal to M, and M is an integer greater than or equal to 1.

With reference to the second aspect, in an optional implementation, the processing result of the to-be-processed text is any one of the following processing results:

an emotion classification result of the to-be-processed text, a semantic intention classification result of the to-be-processed text, a sequence tagging result of the to-be-processed text, or a translation result of the to-be-processed text.

According to a third aspect, a text processing model training apparatus is provided, including: a memory, configured to store a program; and a processor, configured to execute the program stored in the memory, where when the processor executes the program stored in the memory, the processor is configured to: obtain training text; separately input the training text into a teacher model and a student model to obtain sample data output by the teacher model and prediction data output by the student model, where the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing; and train a model parameter of the student model based on the sample data and the prediction data, to obtain a target student model.

With reference to the third aspect, in an optional implementation, the processor is specifically configured to: train the intermediate layer of the student model based on the sample semantic feature and the prediction semantic feature; and train the output layer of the student model based on the sample label and the prediction label.

With reference to the third aspect, in an optional implementation, the teacher model and the student model are transformer models, the intermediate layer of the teacher model includes N transformer layers, and the intermediate layer of the student model includes M transformer layers; and the processor is specifically configured to: select M transformer layers from the N transformer layers included in the teacher model, where each of the M transformer layers includes an attention mechanism module and a forward network module; and train an $i^{th}$ transformer layer of the student model based on a sample semantic feature output by an $i^{th}$ transformer layer of the M transformer layers of the teacher model and an attention score matrix in the attention mechanism module included in the $i^{th}$ transformer layer of the teacher model, where N is a positive integer greater than or equal to M, i is a positive integer less than or equal to M, and M is an integer greater than or equal to 1.

With reference to the third aspect, in an optional implementation, the training text is an enhanced text set, and the processor is further configured to: perform partial word replacement on an obtained original text set to obtain a replacement text set; and obtain the enhanced text set based on the original text set and the replacement text set, where each piece of training text in the enhanced text set includes label information, and the label information includes any one of information indicating a classification result of the training text, sequence tagging information, or text translation label information; and the classification result includes an emotion classification result of the training text or a semantic intention classification result of the training text.

With reference to the third aspect, in an optional implementation, the processor is specifically configured to: obtain first text, where the first text is any text in the original text set; determine a replacement position of a word in the first text based on a replacement threshold of each word in the first text; mask one or more words at the replacement position to generate masked text; and input the masked text into a pre-trained language model to obtain replacement text of the first text.

With reference to the third aspect, in an optional implementation, the processor is specifically configured to input the masked text into the pre-trained language model to obtain the replacement text of the first text by using a greedy algorithm and/or a beam search algorithm.

With reference to the third aspect, in an optional implementation, the training text includes the label information, and before the training text is obtained, the processor is further configured to: obtain initial training text, where the initial training text does not include label information; separately input the initial training text into an initial teacher model and an initial student model to obtain an initial sample semantic feature output by an intermediate layer of the initial teacher model and an initial prediction semantic feature output by an intermediate layer of the initial student model, where the teacher model is obtained by training the initial teacher model with the training text; and train a model parameter of the initial student model based on the initial sample semantic feature and the initial prediction semantic feature, to obtain the student model.

Optionally, the label information may include any one of information indicating a classification result of the training text, sequence tagging information, or text translation label information. The classification result includes an emotion classification result of the training text or a semantic intention classification result of the training text.

With reference to the third aspect, in an optional implementation, the initial teacher model and the initial student model are transformer models, the intermediate layer of the initial teacher model includes N transformer layers, and the intermediate layer of the initial student model includes M transformer layers; and the processor is specifically configured to: select M transformer layers from the N transformer layers included in the initial teacher model, where each of the M transformer layers includes an attention mechanism module and a forward network module; and train an $i^{th}$ transformer layer of the initial student model based on a sample semantic feature output by an $i^{th}$ transformer layer of the M transformer layers of the initial teacher model and an attention score matrix in the attention mechanism module included in the $i^{th}$ transformer layer of the initial teacher model, where N is a positive integer greater than or equal to M, i is a positive integer less than or equal to M, and M is an integer greater than or equal to 1.

It should be understood that the extension, limitation, explanation, and description of related content in the first aspect are also applicable to the same content in the third aspect.

According to a fourth aspect, a text processing apparatus is provided, including: a memory, configured to store a program; and a processor, configured to execute the program stored in the memory, where when the processor executes the program stored in the memory, the processor is configured to: obtain to-be-processed text; and input the to-be-processed text into a target student model to obtain a processing result of the to-be-processed text, where the target student model is obtained by training a student model based on sample data and prediction data, the sample data is obtained based on training text and a teacher model, and the prediction data is obtained based on the training text and the student model; the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing.

With reference to the fourth aspect, in an optional implementation, an intermediate layer of the target student model is obtained through training based on the sample semantic feature and the prediction semantic feature; and an output layer of the target student model is obtained through training based on the sample label and the prediction label.

With reference to the fourth aspect, in an optional implementation, the teacher model and the student model are transformer models, the intermediate layer of the teacher model includes N transformer layers, and the intermediate layer of the student model includes M transformer layers; each of the M transformer layers includes an attention mechanism module and a forward network module; a model parameter of an $i^{th}$ transformer layer of the target student model is obtained through training based on a sample semantic feature output by an $i^{th}$ transformer layer of M transformer layers of the teacher model and an attention score matrix in the attention mechanism module included in the $i^{th}$ transformer layer of the teacher model; and the M transformer layers of the teacher model are selected from the N transformer layers of the teacher model, where N is a positive integer greater than or equal to M, i is a positive integer less than or equal to M, and M is an integer greater than or equal to 1.

With reference to the fourth aspect, in an optional implementation, the training text is an enhanced text set, each piece of training text in the enhanced text set includes label information, and the label information includes any one of information indicating a classification result of the training text, sequence tagging information, or text translation label information; and the classification result includes an emotion classification result of the training text or a semantic intention classification result of the training text.

With reference to the fourth aspect, in an optional implementation, the replacement text set includes replacement text of first text, the first text is any text in the original text set, and the replacement text of the first text is obtained by inputting masked text into a pre-trained language model; and the masked text is obtained by masking one or more words at a replacement position in the first text, and the replacement position is determined based on a replacement threshold of each word in the first text.

With reference to the fourth aspect, in an optional implementation, the replacement text of the first text is obtained by using a greedy algorithm and/or a beam search algorithm by inputting the masked text into the pre-trained language model.

With reference to the fourth aspect, in an optional implementation, the training text includes the label information, and the student model is obtained by training an initial student model based on an initial sample semantic feature and an initial prediction semantic feature; and the initial sample semantic feature is output data that is of an intermediate layer of an initial teacher model and that is obtained by inputting initial training text into the initial teacher model, the prediction semantic feature is output data that is of an intermediate layer of the initial student model and that is obtained by inputting the initial training text into the initial student model, and the initial training text does not include label information. For example, the initial teacher model and the initial student model each include an input layer, one or more intermediate layers, and an output layer.

With reference to the fourth aspect, in an optional implementation, the initial teacher model and the initial student model are transformer models, the intermediate layer of the initial teacher model includes N transformer layers, and the intermediate layer of the initial student model includes M transformer layers; each of the M transformer layers includes an attention mechanism module and a forward network module; a model parameter of an $i^{th}$ transformer layer of the initial student model is obtained through training based on a sample semantic feature output by an $i^{th}$ transformer layer of M transformer layers of the initial teacher model and an attention score matrix in the attention mechanism module included in the $i^{th}$ transformer layer of the initial teacher model; and the M transformer layers of the initial teacher model are selected from the N transformer layers of the teacher model, where N is a positive integer greater than or equal to M, i is a positive integer less than or equal to M, and M is an integer greater than or equal to 1.

With reference to the fourth aspect, in an optional implementation, the processing result of the to-be-processed text is any one of the following processing results:

an emotion classification result of the to-be-processed text, a semantic intention classification result of the to-be-processed text, a sequence tagging result of the to-be-processed text, or a translation result of the to-be-processed text.

It should be understood that the extension, limitation, explanation, and description of related content in the second aspect are also applicable to the same content in the fourth aspect.

According to a fifth aspect, a text processing model training apparatus is provided, including a function module/unit configured to perform the training method in any one of the first aspect and the possible implementations of the first aspect.

According to a sixth aspect, a text processing apparatus is provided, including a function module/unit configured to perform the text processing method in any one of the second aspect and the possible implementations of the second aspect.

According to a seventh aspect, a computer-readable medium is provided. The computer-readable medium stores program code to be executed by a device, and the program code is used to perform the training method in any one of the first aspect or the implementations of the first aspect.

According to an eighth aspect, a computer-readable medium is provided. The computer-readable medium stores program code to be executed by a device, and the program code is used to perform the text processing method in any one of the second aspect or the implementations of the second aspect.

According to a ninth aspect, a computer program product is provided. The computer program product includes computer program code. When the computer program code is run on a computer, the computer is enabled to perform the methods in the foregoing aspects.

It should be noted that some or all of the computer program code can be stored in a first storage medium. The first storage medium can be encapsulated with a processor, or encapsulated separately from a processor. This is not specifically limited in the embodiments of this disclosure.

According to a tenth aspect, a chip is provided. The chip includes a processor and a data interface, and the processor reads, through the data interface, instructions stored in a memory, to perform the training method in any one of the first aspect or the implementations of the first aspect.

Optionally, in an implementation, the chip may further include the memory, and the memory stores the instructions. The processor is configured to execute the instructions stored in the memory; and when the instructions are executed, the processor is configured to perform the training method in any one of the first aspect or the implementations of the first aspect.

According to an eleventh aspect, a chip is provided. The chip includes a processor and a data interface, and the processor reads, through the data interface, instructions stored in a memory, to perform the text processing method in any one of the second aspect or the implementations of the second aspect.

Optionally, in an implementation, the chip may further include the memory, and the memory stores the instructions. The processor is configured to execute the instructions stored in the memory, and when the instructions are executed, the processor is configured to perform the text processing method in any one of the second aspect or the implementations of the second aspect.

DESCRIPTION OF EMBODIMENTS

The following describes the technical solutions in the embodiments of this disclosure with reference to the accompanying drawings in the embodiments of this disclosure. It is clear that the described embodiments are merely some but not all of the embodiments of this disclosure. All other embodiments obtained by a person of ordinary skill in the art based on the embodiments of this disclosure without creative efforts shall fall within the protection scope of this disclosure.

Figure 1:
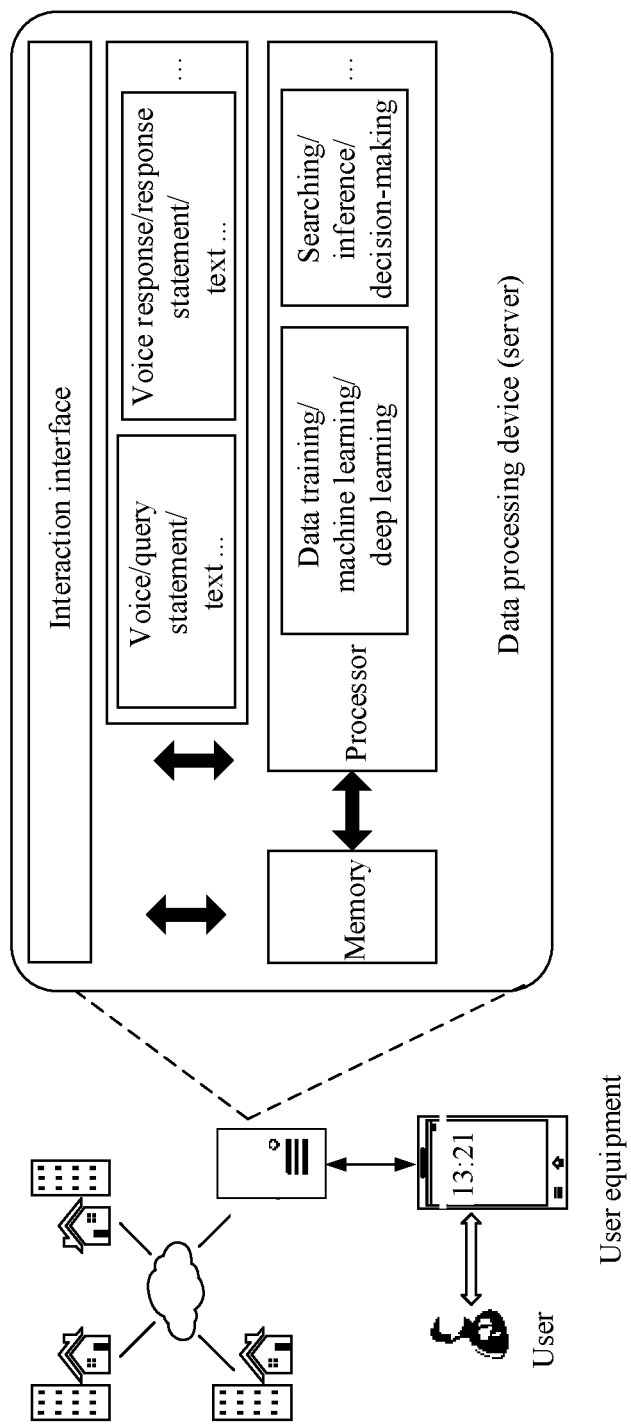
FIG. 1 is a schematic diagram of an application scenario of natural language processing according to an embodiment of this disclosure.
Figure 2:
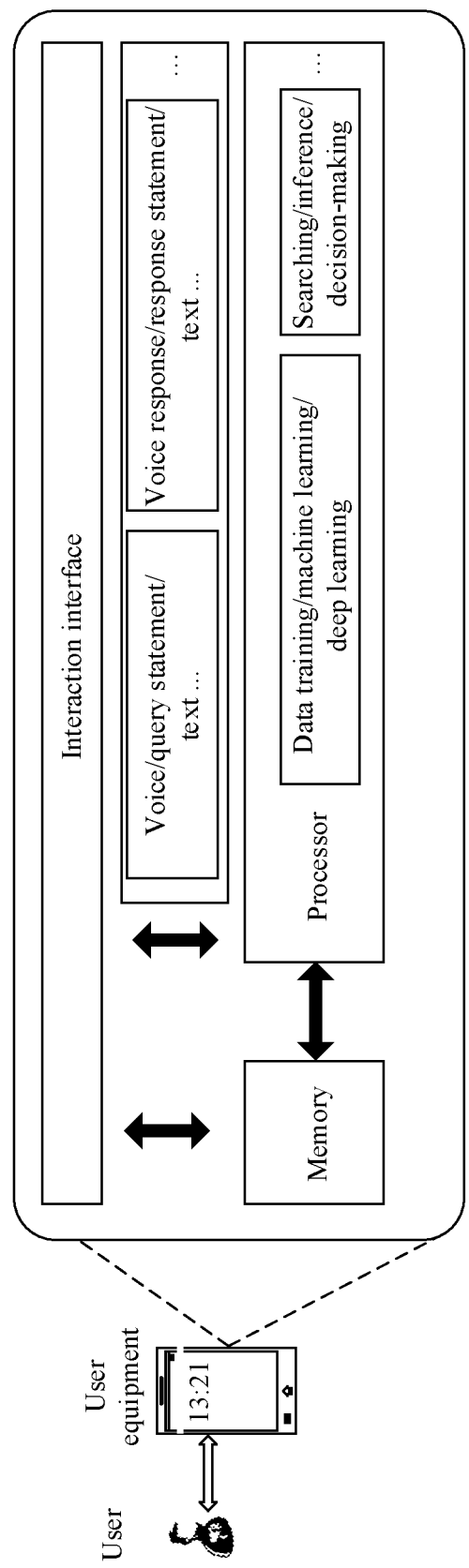
FIG. 2 is a schematic diagram of another application scenario of natural language processing according to an embodiment of this disclosure.
Figure 3:
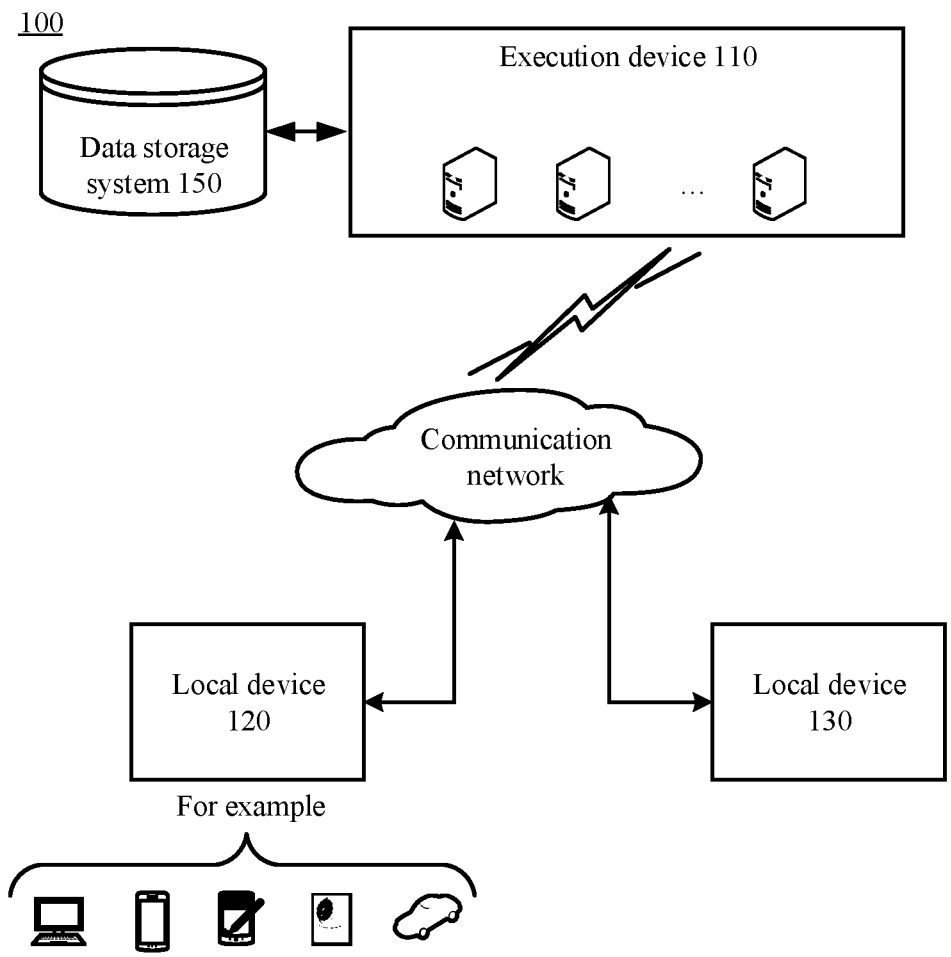
FIG. 3 is a schematic diagram of a device related to natural language processing according to an embodiment of this disclosure.

To better understand the solutions in the embodiments of this disclosure, the following briefly describes an optional application scenario in the embodiments of this disclosure with reference to FIG. 1 to FIG. 3.

FIG. 1 shows a natural language processing system. The natural language processing system includes user equipment and a data processing device. The user equipment includes an intelligent terminal such as a mobile phone, a personal computer, or an information processing center. The user equipment is an initiating end of natural language data processing. As an initiator of a request for language questioning and answering, querying, or the like, a user usually initiates the request by using the user equipment.

The data processing device may be a device or a server having a data processing function, for example, a cloud server, a network server, an application server, or a management server. The data processing device receives, through an interaction interface, a question of a query statement, voice, text, or the like from the intelligent terminal, and then performs language data processing, by using a memory storing data and a processor processing data, including machine learning, deep learning, searching, inference, decision-making, or the like. The memory in the data processing device may be a general name, including a local storage and a database storing historical data. The database may be in the data processing device, or may be in another network server.

In the natural language processing system shown in FIG. 1, the user equipment may receive instructions of the user. For example, the user equipment may receive a piece of text input by the user, and then initiate a request to the data processing device, so that the data processing device executes a natural language processing application (for example, text classification, text sequence tagging, or translation) for the piece of text obtained by the user equipment, to obtain a processing result of the corresponding natural language processing application (for example, text classification, text sequence tagging, or translation) for the piece of text.

For example, the user equipment may receive to-be-processed text input by the user, and then initiate a request to the data processing device, so that the data processing device classifies the to-be-processed text, to obtain a classification result for the to-be-processed text. The classification result may refer to a user semantic intention indicated by the to-be-processed text, for example, an intention used by the user to indicate song playing, time setting, and navigation enabling. Alternatively, the classification result may be used to indicate an emotion classification result of the user, for example, the classification result may indicate that a user emotion classification corresponding to the to-be-processed text is depressed, happy, angry, or the like.

For example, the data processing device in FIG. 1 may perform a text processing method according to an embodiment of this disclosure.

FIG. 2 shows another natural language processing system. In FIG. 2, user equipment is directly used as a data processing device. The user equipment can directly receive input from a user, and the input is directly processed through hardware of the user equipment. A specific process is similar to that in FIG. 1. For details, refer to the foregoing descriptions. Details are not described herein again.

In the natural language processing system shown in FIG. 2, the user equipment may receive instructions of the user, and the user equipment classifies to-be-processed text to obtain a classification result of the to-be-processed text.

In the natural language processing system shown in FIG. 2, the user equipment may receive instructions of the user. For example, the user equipment may receive a piece of text input by the user, and then the user equipment executes a natural language processing application (for example, text classification, text sequence tagging, or translation) for the piece of text, to obtain a processing result of the corresponding natural language processing application (for example, text classification, text sequence tagging, or translation) for the piece of text.

In FIG. 2, the user equipment may perform the text processing method according to an embodiment of this disclosure.

FIG. 3 is a schematic diagram of a device related to natural language processing according to an embodiment of this disclosure.

The user equipment in FIG. 1 and FIG. 2 may be specifically a local device 130 or a local device 120 in FIG. 3, and the data processing device in FIG. 1 may be specifically an execution device 110 in FIG. 3. A data storage system 150 may store data to be processed by the execution device 110. The data storage system 150 may be integrated into the execution device 110, or may be disposed on a cloud or another network server.

The processors in FIG. 1 and FIG. 2 may perform data training/machine learning/deep learning by using a neural network model or another model, and process input to-be-processed text by using a model finally obtained through data training or learning, to obtain a processing result of the to-be-processed text.

Because the embodiments of this disclosure relate to massive application of a neural network, for ease of understanding, the following describes terms and concepts related to the neural network that may be used in the embodiments of this disclosure.

(1) Neural Network

The neural network may include a neuron. The neuron may be an operation unit that uses $x_s$ and an intercept of 1 as input. Output of the operation unit may be as follows:

$$h_{W,b}(x) = f(W^T x) = f(\Sigma_{s=1}^{n} W_s x_s + b).$$

Herein, s=1, 2, . . . , n, n is a natural number greater than 1, $W_s$ represents a weight of $x_s$, b represents a bias of the neuron, and f represents an activation function (activation function) of the neuron, where the activation function is used to introduce a non-linear characteristic into the neural network, to convert an input signal in the neuron into an output signal. The output signal of the activation function may be used as input of a next convolutional layer, and the activation function may be a sigmoid function. The neural network is a network constituted by connecting a plurality of single neurons together. To be specific, output of a neuron may be input of another neuron. Input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. The DNN is divided based on positions of the different layers. The layers Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is necessarily connected to any neuron in an $(i+1)^{th}$ layer.

Although the DNN seems complex, the DNN is actually not complex in terms of work at each layer, and is simply represented as the following linear relationship expression: $\vec{y} = \alpha(W \cdot \vec{x} + \vec{b})$, where $\vec{x}$ is an input vector, $\vec{y}$ is an output vector, $\vec{b}$ is a bias vector, W is a weight matrix (which is also referred to as a coefficient), and $\alpha(\ )$ is an activation function. At each layer, the output vector $\vec{x}$ is obtained by performing such a simple operation on the input vector $\vec{y}$. Due to a large quantity of DNN layers, quantities of coefficients W and bias vectors $\vec{b}$ are also large. Definitions of the parameters in the DNN are as follows: The coefficient W is used as an example. It is assumed that in a DNN with three layers, a linear coefficient from the fourth neuron at the second layer to the second neuron at the third layer is defined as $W_{24}^{3}$. A superscript 3 represents a number of a layer in which the coefficient W is located, and a subscript corresponds to an index 2 of the third layer for output and an index 4 of the second layer for input.

In conclusion, a coefficient from a $k^{th}$ neuron at an $(L-1)^{th}$ layer to a $j^{th}$ neuron at an $L^{th}$ layer is defined as $W_{jk}^{L}$.

It should be noted that the input layer has no parameter W. In the deep neural network, more hidden layers make the network more capable of describing a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of a plurality of layers).

(3) Loss Function

In a process of training a deep neural network, because it is expected that output of the deep neural network is as close as possible to a value that is actually expected to be predicted, a current predicted value of the network may be compared with a target value that is actually expected, and then a weight vector at each layer of the neural network is updated based on a difference between the current predicted value and the target value (there is usually an initialization process before the first update, namely, a parameter is preconfigured for each layer of the deep neural network). For example, if the predicted value of the network is large, the weight vector is adjusted to lower the predicted value until the deep neural network can predict the target value that is actually expected or a value close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(4) Back Propagation Algorithm

In a training process, a neural network may correct values of parameters in an initial neural network model by using an error back propagation (BP) algorithm, so that a reconstruction error loss of the neural network model becomes increasingly smaller. Specifically, an input signal is forward transferred until an error loss occurs in output, and the parameters in the initial neural network model are updated based on back propagation error loss information, so that the error loss is reduced. The back propagation algorithm is a back propagation motion mainly dependent on the error loss, and aims to obtain parameters of an optimal neural network model, for example, a weight matrix.

(5) Attention Mechanism

The attention mechanism simulates an internal process of biological observation behavior, and is a mechanism that aligns internal experience with external feeling to increase observation precision of some regions. The mechanism can quickly select high-value information from a large amount of information by using limited attention resources. The attention mechanism is widely used in natural language processing tasks, especially machine translation, because the attention mechanism can quickly extract an important feature of sparse data. A self-attention mechanism is improvement of the attention mechanism. The self-attention mechanism becomes less dependent on external information and is better at capturing an internal correlation of data or features.

(6) Language Model (LM)

The language model is a basic model in NPL. Through a large amount of corpus training and learning, the LM can infer a probability of an unknown word based on existing information (for example, text information such as a word that is present in a context). The LM may also be understood as a probability model used to calculate a probability of a sentence.

In other words, the language model is a probability distribution of a natural language text sequence, and the probability distribution represents a possibility of existence of text with a specific sequence and a specific length. In short, the language model predicts a next word based on a context. Because there is no need to manually tag a corpus, the language model can learn rich semantic knowledge from an unlimited large-scale corpus.

(7) Large-Scale Pre-Trained Language Model

The large-scale pre-trained language model may also be referred to as a large-scale language pre-trained model. Generally, by using a large-scale corpus (for example, language training materials such as sentences and paragraphs), a language model training task is designed, and a large-scale neural network algorithm structure is trained to learn; and a finally obtained large-scale neural network algorithm structure is the large-scale pre-trained language model. For another subsequent task, feature extraction or task fine-tuning may be performed based on the model to fulfill a specific task.

An idea of pre-training is to first train a task to obtain a set of model parameters, then initialize network model parameters by using the set of model parameters, and then train another task by using an initialized network model, to obtain a model adapted to the another task. Through pre-training by using the large-scale corpus, a neural language representation model can learn a powerful language representation capability and can extract rich syntactic and semantic information from text. The large-scale pre-trained language model may provide a sentence-level feature and a token that includes rich semantic information used by a downstream task, or perform fine-tuning for a downstream task directly on the basis of the pre-trained model. In this way, a downstream dedicated model is quickly and conveniently obtained.

Figure 5:
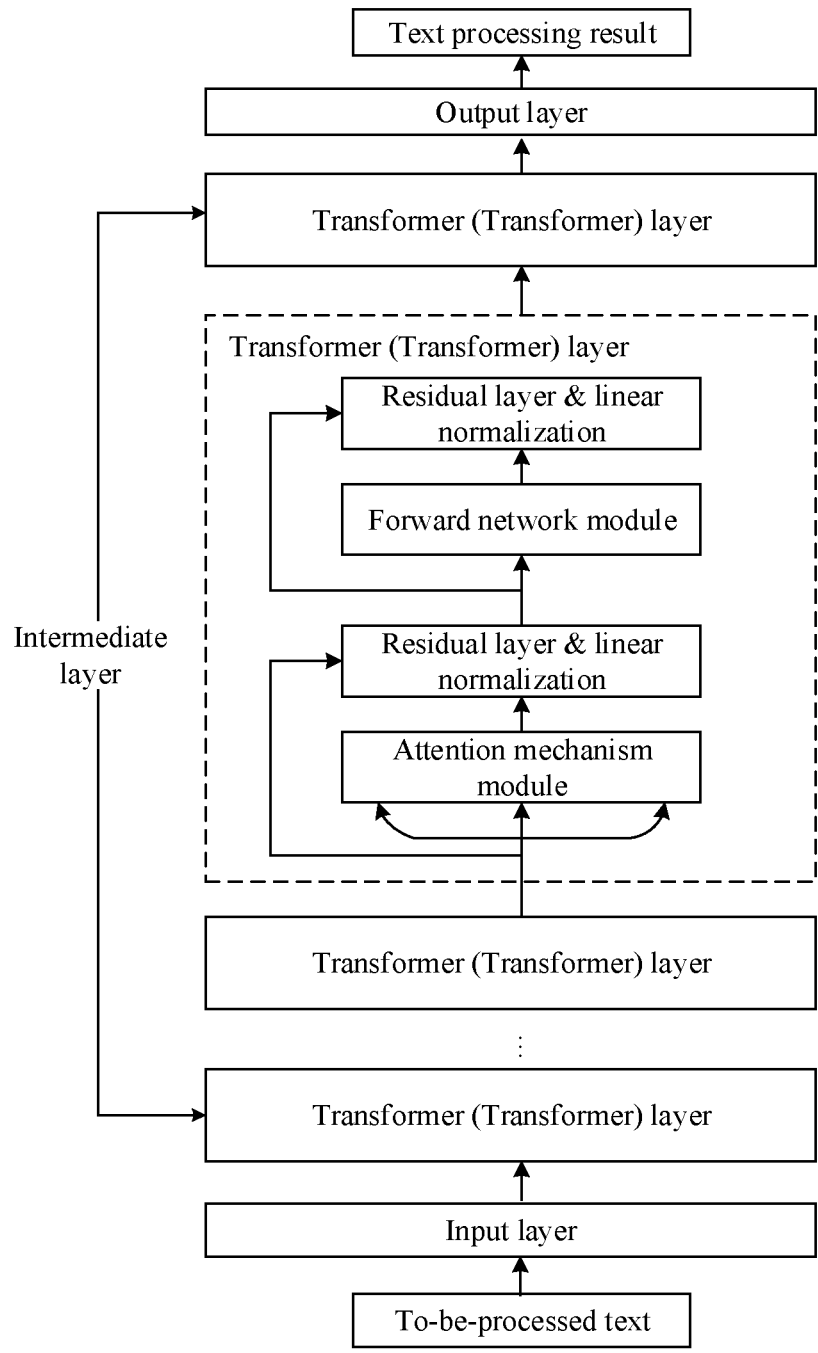
FIG. 5 is a schematic diagram of a structure of a transformer (Transformer) model according to an embodiment of this disclosure.

For example, as shown in FIG. 5, currently most advanced pre-trained language models are all models based on a transformer structure. Compared with previous neural networks (such as a recurrent neural network and a convolutional neural network), a transformer layer includes an attention mechanism module and a forward network module. The attention mechanism module obtains a corresponding weight value by calculating correlation between words and finally obtains context-sensitive word representation, and is a core part of the transformer structure. The forward network module may perform further transformation on the obtained word representation to obtain final output of the transformer layer. In addition to the two important modules, a residual layer and linear normalization may be included.

(8) Knowledge Distillation

Knowledge distillation is a key technology that can implement miniaturization of a deep learning model to meet a deployment requirement of a terminal device. Compared with compression technologies such as quantization and sparsification, the knowledge distillation technology can achieve a purpose of compressing a model without specific hardware support. The knowledge distillation technology uses a policy of teacher-student model learning. A teacher model may have a large quantity of model parameters, and generally cannot meet the deployment requirement. A student model has a small quantity of parameters, and can be directly deployed. An effective knowledge distillation algorithm is designed, so that the student model learns to imitate behavior of the teacher model to perform effective knowledge transfer. In this way, the student model can finally show a same processing capability as the teacher model.

Figure 4:
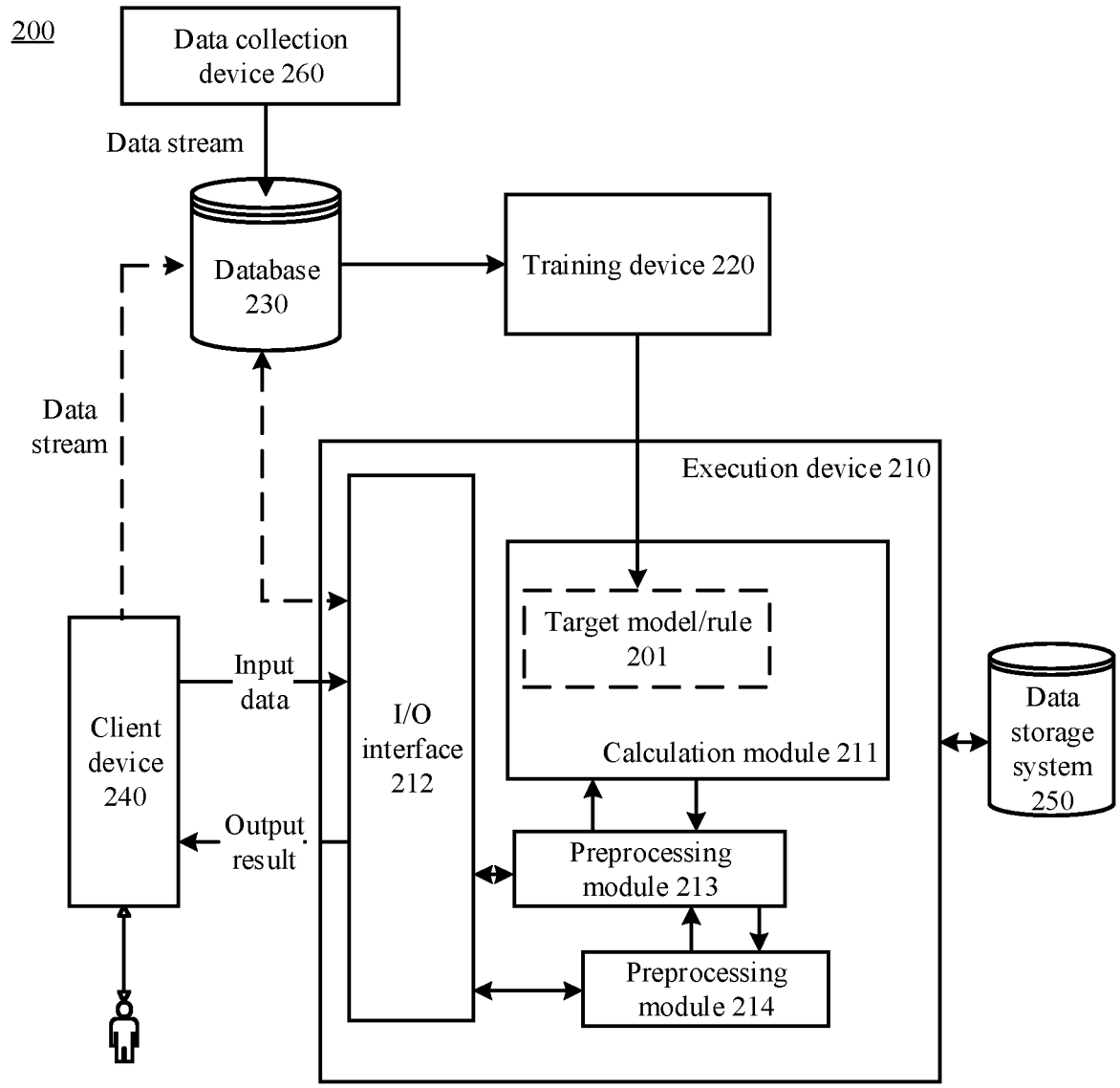
FIG. 4 is a schematic diagram of a system architecture according to an embodiment of this disclosure.

First, a system architecture of the text processing model training method and the text processing method that are provided in the embodiments of this disclosure is described. Refer to FIG. 4. An embodiment of this disclosure provides a system architecture 200. As shown in the system architecture 200 in FIG. 4, a data collection device 260 is configured to collect training data.

For example, the training data in this embodiment of this disclosure may be training text for training a text processing model.

After collecting the training data, the data collection device 260 stores the training data in a database 230. A training device 220 obtains a target model/rule 201 (namely, a target student model in this embodiment of this disclosure) by performing training based on the training data maintained in the database 230. The training device 220 separately inputs training text into a teacher model and a student model for processing, and compares sample data output by the teacher model with prediction data output by the student model, until a difference between the prediction data output by the trained student model and the sample data meets a preset condition (for example, the difference between the prediction data output by the student model and the sample data output by the teacher model is less than a specific threshold, or the difference between the prediction data output by the student model and the sample data output by the teacher model remains unchanged or no longer decreases), to complete training of the target model/rule 201. Then, how the training device 220 obtains the target model/rule 201 based on the training data is to be described in more detail with reference to FIG. 8.

In addition, the target model/rule 201 can be used to implement the text processing method provided in the embodiments of this disclosure. To be specific, after related preprocessing is performed on to-be-processed text (processing may be performed by using a preprocessing module 213 and/or a preprocessing module 214), to-be-processed text obtained through the related preprocessing is input into the target model/rule 201 for processing, to obtain a processing result corresponding to the target task performed by the target processing model.

For example, the target task is text classification. In this case, the target student model may be a text classification model, and the to-be-processed text is input into the target model/rule 201 (namely the target student model in this application) for classification processing, to obtain a classification result of the to-be-processed text.

For example, the target task is text sequence tagging. In this case, the target student model may be a text sequence tagging model, and the to-be-processed text is input into the target model/rule 201 (namely, the target student model in this application) for sequence tagging processing, to obtain sequence tagging of the to-be-processed text.

For example, the target task is text translation. In this case, the target student model may be a text translation model, and the to-be-processed text is input into the target model/rule 201 (namely, the target student model in this application) for translation processing, to obtain translated text of the to-be-processed text.

In this embodiment provided in this disclosure, the target model/rule 201 is obtained by training an original processing model. It should be noted that, in actual application, the training data maintained in the database 230 may not all be collected by the data collection device 260, or may be received and obtained from another device.

It should be further noted that the training device 220 may not necessarily train the target model/rule 201 completely based on the training data maintained in the database 230, or may obtain training data from a cloud or another place to perform model training. The foregoing description should not be construed as a limitation on the embodiments of this disclosure. It should be further noted that at least a part of the training data maintained in the database 230 may also be used to perform a process of processing the to-be-processed text by an execution device 210.

The target model/rule 201 obtained through training by the training device 220 may be used in different systems or devices, for example, the execution device 210 shown in FIG. 4. The execution device 210 may be a terminal, for example, a mobile phone terminal, a tablet, a laptop computer, an augmented reality (AR)/virtual reality (VR) terminal, or a vehicle-mounted terminal, or may be a server, a cloud, or the like.

In FIG. 4, an input/output (I/O) interface 212 is configured for the execution device 210, to exchange data with an external device. The user may input data into the I/O interface 212 by using a client device 240. In this embodiment of this disclosure, the input data may include the to-be-processed text.

The preprocessing module 213 and/or the preprocessing module 214 are/is configured to perform preprocessing based on the input data received by the I/O interface 212. In this embodiment of this disclosure, there may alternatively be no preprocessing module 213 and no preprocessing module 214 (or there may be only one of the preprocessing modules), and the input data is processed directly by using a calculation module 211. It should be noted that the preprocessing module 213 or the preprocessing module 214 may preprocess all the input data, or may preprocess a part of the input data.

It should be noted that the preprocessing module 213 and/or the preprocessing module 214 may alternatively be trained in the training device 220. The calculation module 211 is configured to perform, based on the target model/rule 201, related processing such as calculation on the input data from the preprocessing module 213 or the I/O interface 212.

In a process in which the execution device 210 performs preprocessing on the input data or the calculation module 211 of the execution device 210 performs related processing such as calculation, the execution device 210 may invoke data, code, and the like in a data storage system 250 for corresponding processing, and may also store data, instructions, and the like obtained through corresponding processing into the data storage system 250.

Finally, the I/O interface 212 feeds back a processing result (for example, a classification result, a translation result, or a sequence tagging result) to the client device 240. It should be understood that different natural language processing tasks correspond to different target models/rules 201, and corresponding processing results of the target models/rules 201 are also different.

It should be noted that, for different teacher models, the training device 220 may generate target models/rules 201 (for example, target student models) corresponding to the teacher models. The corresponding target models/rules 201 may be used to complete the foregoing tasks, thereby providing desired results for the user. It should be noted that the training device 220 may further generate corresponding preprocessing models for the target models/rules 201 corresponding to the different downstream systems, for example, corresponding preprocessing models in the preprocessing module 213 and/or the preprocessing module 214.

In the case shown in FIG. 4, the user may manually give the input data (for example, the to-be-processed text), and the manually giving may be an operation performed through an interface provided by the I/O interface 212. In another case, the client device 240 may automatically send the input data (for example, the to-be-processed text) to the I/O interface 212. If authorization of the user needs to be obtained for requesting the client device 240 to automatically send the input data, the user may set a corresponding permission on the client device 240. The user may view, on the client device 240, a result output by the execution device 210, and a specific presentation form may be a specific manner such as display, sound, or action. The client device 240 may also serve as a data collection end to collect, as new sample data, the input data that is input into the I/O interface 212 and the output result that is output from the I/O interface 212 that are shown in the figure, and store the new sample data into the database 230. Certainly, the client device 240 may alternatively not perform collection, but the I/O interface 212 directly stores, as new sample data into the database 230, the input data that is input into the I/O interface 212 and the output result that is output from the I/O interface 212 that are shown in the figure.

It should be noted that FIG. 4 is merely a schematic diagram of the system architecture according to this embodiment of this disclosure. A location relationship between devices, components, modules, and the like shown in the figure does not constitute any limitation. For example, in FIG. 4, the data storage system 250 is an external memory relative to the execution device 210. In another case, the data storage system 250 may alternatively be disposed in the execution device 210.

As shown in FIG. 4, the target model/rule 201 is obtained by the training device 220 by performing training. The target model/rule 201 may be the target student model in this embodiment of this disclosure. Specifically, the target student model provided in this embodiment of this disclosure may be a transformer model.

As shown in FIG. 5, the transformer model may be a model constructed by stacking one or more transformer layers. The transformer layer may include an attention mechanism module and a forward network module. The attention mechanism module obtains a corresponding weight value by calculating correlation between words and finally obtains context-sensitive word representation, and is a core part of a transformer structure. The forward network module may perform further transformation on the obtained word representation to obtain final output of the transformer layer. In addition to the two important modules, a residual layer and linear normalization (linear normalization) may be included.

For example, in this embodiment of this disclosure, the target student model may be any one of bidirectional encoder representation from transformers (BERT), generalized autoregressive pretraining for language understanding (XLNet), a robustly optimized BERT pretraining approach (RoBERTa), or another transformer model that uses the transformer structure.

Figure 6:
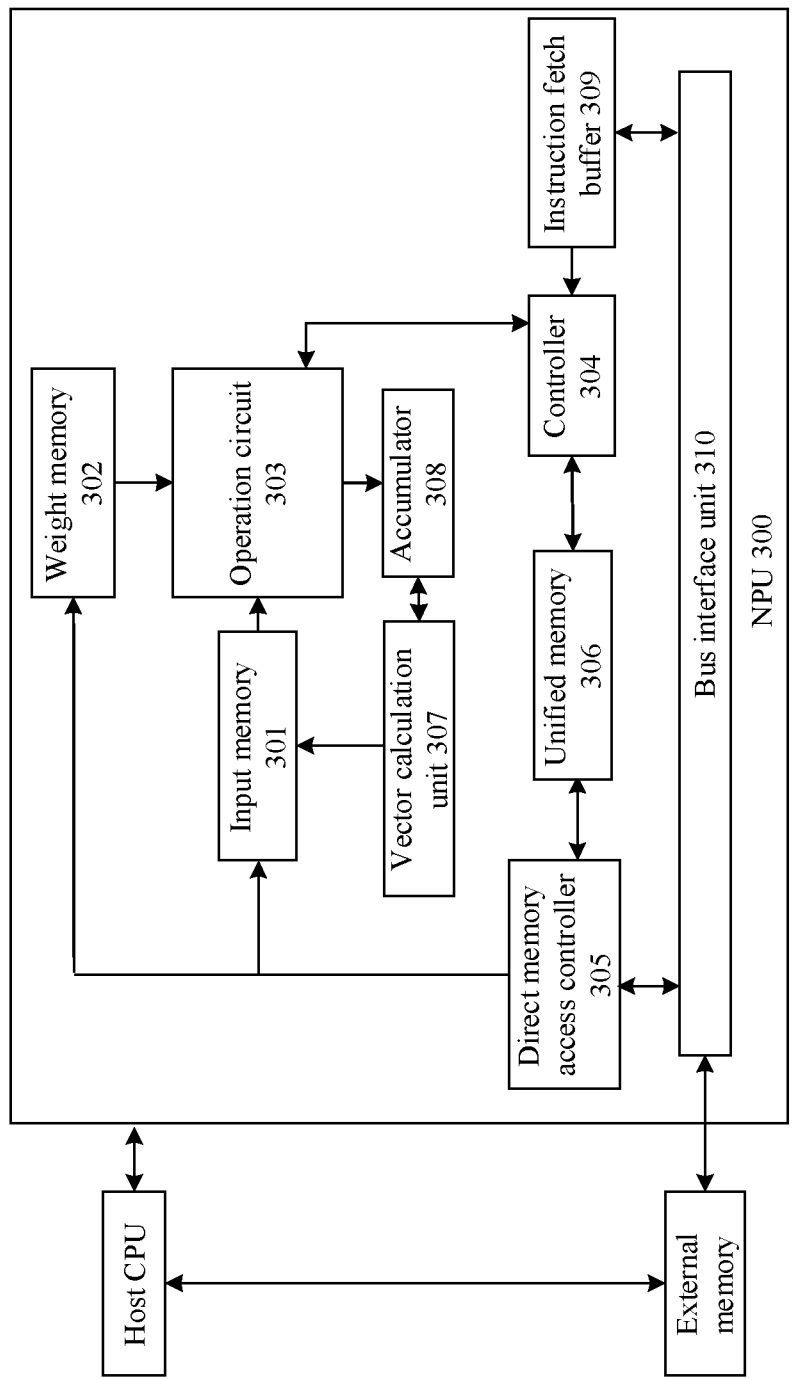
FIG. 6 is a schematic diagram of a hardware structure of a chip according to an embodiment of this disclosure.

FIG. 6 is a schematic diagram of a hardware structure of a chip according to an embodiment of this disclosure. The chip includes a neural-network processing unit 300. The chip may be disposed in the execution device 210 shown in FIG. 4, and is configured to complete calculation work of the calculation module 211. The chip may alternatively be disposed in the training device 220 shown in FIG. 4, and is configured to complete training work of the training device 220 and output the target model/rule 201. An algorithm of each layer in the transformer model shown in FIG. 5 may be implemented in the chip shown in FIG. 6.

The neural-network processing unit NPU 300 serves as a coprocessor, and may be disposed on a host central processing unit (CPU) (host CPU). The host CPU assigns a task. A core part of the NPU 300 is an operation circuit 303, and a controller 304 controls the operation circuit 303 to extract data in a memory (a weight memory or an input memory) and perform an operation.

In some implementations, the operation circuit 303 internally includes a plurality of process engines (PEs). In some implementations, the operation circuit 303 is a two-dimensional systolic array. The operation circuit 303 may alternatively be a one-dimensional systolic array or another electronic circuit that can perform mathematical operations such as multiplication and addition. In some implementations, the operation circuit 303 is a general-purpose matrix processor.

For example, it is assumed that there are an input matrix A, a weight matrix B, and an output matrix C. The operation circuit 303 fetches, from a weight memory 302, data corresponding to the matrix B, and buffers the data in each PE of the operation circuit 303. The operation circuit 303 stores, into an accumulator 308, some matrix results or a final matrix result obtained by performing a matrix operation on data of the matrix A fetched from an input memory 301 and the matrix B.

A vector calculation unit 307 may perform further processing such as vector multiplication, vector addition, an exponent operation, a logarithmic operation, or value comparison on output of the operation circuit 303. For example, the vector calculation unit 307 may be configured to perform network calculation, such as pooling, batch normalization, or local response normalization, at a non-convolution/non-FC layer of a neural network.

In some implementations, the vector calculation unit 307 can store a processed output vector in a unified memory 306. For example, the vector calculation unit 307 may apply a non-linear function to the output of the operation circuit 303. For example, the non-linear function is applied to a vector of an accumulated value to generate an activation value.

In some implementations, the vector calculation unit 307 generates a normalized value, a combined value, or both.

In some implementations, a processed output vector can be used as an activation input to the operation circuit 303, for example, the processed output vector can be used at a subsequent layer of the neural network.

The unified memory 306 is configured to store input data and output data. For weight data, a direct memory access controller (DMAC) 305 transfers input data in an external memory to the input memory 301 and/or the unified memory 306, stores weight data in the external memory into the weight memory 302, and stores data in the unified memory 306 into the external memory.

A bus interface unit (BIU) 310 is configured to implement interaction between the host CPU, the DMAC, and an instruction fetch buffer 309 through a bus.

The instruction fetch buffer 309 connected to the controller 304 is configured to store instructions to be used by the controller 304. The controller 304 is configured to invoke the instructions buffered in the instruction fetch buffer 309, to control a working process of an operation accelerator.

Generally, the unified memory 306, the input memory 301, the weight memory 302, and the instruction fetch buffer 309 each are an on-chip memory. The external memory is a memory outside the NPU. The external memory may be a double data rate synchronous dynamic random access memory (DDR SDRAM), a high bandwidth memory (HBM), or another readable and writable memory.

An operation of each layer in the transformer model shown in FIG. 5 may be performed by the operation circuit 303 or the vector calculation unit 307.

The execution device 210 in FIG. 4 described above can perform steps of the text processing model training method or the text processing method in the embodiments of this disclosure. The transformer model shown in FIG. 5 and the chip shown in FIG. 6 may also be configured to perform steps of the text processing model training method or the text processing method in the embodiments of this disclosure.

Currently, in the NLP field, when a knowledge distillation technology is applied to a pre-trained language model, usually, a student model directly learns an output result of a teacher model. In addition, the student model mostly uses a long short-term memory (LSTM) structure and a CNN structure. As a result, knowledge distillation efficiency of the pre-trained language model is relatively low.

In view of this, the embodiments of this disclosure provide a text processing model training method (namely, a knowledge distillation method for a text processing model). A student model may be enabled to continuously learn output data of an intermediate layer and an output layer of a teacher model, to avoid a problem that the student model only learns output data of the output layer of the teacher model, causing relatively low transfer efficiency, namely, relatively low accuracy of text processing by the student model. By using the text processing model training method in the embodiments of this disclosure, the student model can learn to imitate the output data of the intermediate layer and the output layer of the teacher model, so that the student model more accurately learns semantic representation of the teacher model to implement effective knowledge transfer, thereby improving accuracy of a text processing result of the student model.

The following describes in detail the text processing model training method in the embodiments of this disclosure with reference to the accompanying drawings. The training method in the embodiments of this disclosure may be performed by devices such as the data processing device in FIG. 1, the user equipment in FIG. 2, the execution device 110 or the local device in FIG. 3, and the execution device 210 in FIG. 4.

Figure 7:
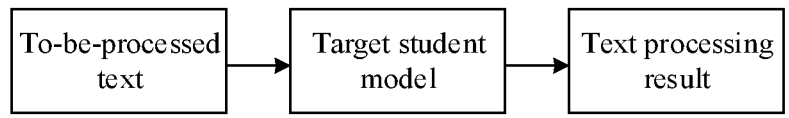
FIG. 7 is a schematic diagram of an application scenario according to an embodiment of this disclosure.

FIG. 7 is a schematic diagram of an application scenario according to an embodiment of this disclosure. As shown in FIG. 7, a processing result of to-be-processed text can be obtained by using a target student model to process the to-be-processed text. The target student model may be a text processing model, and the target student model may be obtained by performing effective knowledge transfer on a student model based on sample data output by a pre-trained teacher model, to obtain the target student model that can be deployed on a terminal device and that is used for text processing.

In an optional implementation, the target student model may be a text classification model, and the to-be-processed text is input into the target student model for classification processing, to obtain a classification result of the to-be-processed text.

Text classification may be emotion classification or semantic intention classification performed on the input to-be-processed text.

For example, to-be-processed text "enable mobile phone navigation" may be input into the text classification model, to obtain a semantic intention "navigation" of a user.

For example, the to-be-processed text may be a piece of text input by the user, and the to-be-processed text is input into the text classification model, to obtain an emotion classification result corresponding to the piece of text, for example, depressed, happy, or angry.

In another possible implementation, the target student model may be a text sequence tagging model, and the to-be-processed text is input into the target student model for sequence tagging processing, to obtain sequence tagging of the to-be-processed text.

Text sequence tagging may mean that a text sequence is input, and a sequence corresponding to the text sequence is output. For example, the sequence tagging may be part-of-speech tagging (POS tagging).

For example, the to-be-processed text may be "John saw the saw", the to-be-processed text is input into the text sequence tagging model, and obtained sequence tagging may be "PN, V, D, and N". The first saw of the two "saws" in the input text is a verb, and the second saw is a noun. Therefore, the text sequence tagging model needs to learn a meaning of the entire input text to obtain the correct part-of-speech tagging.

In another possible implementation, the target student model may be a text translation model, and the to-be-processed text is input into the target student model for translation processing, to obtain translated text of the to-be-processed text.

For example, the to-be-processed text may be a piece of English text input by the user into the text translation model, and Chinese text corresponding to the piece of English text is obtained through machine translation.

As shown in FIG. 7, the target student model may be a miniaturized model that meets requirements for deployment on an intelligent terminal device, such as a model size requirement and a run time requirement. The intelligent terminal may be an electronic device with a camera. For example, the intelligent terminal may be a mobile phone, a tablet personal computer (TPC), a media player, a smart TV, a laptop computer (LC), a personal digital assistant (PDA), a personal computer (PC), a camera, a video camera, a smartwatch, a wearable device (WD), a vehicle-mounted terminal in a self-driving car, or the like with an image processing function. This is not limited in this embodiment of this disclosure.

Figure 8:
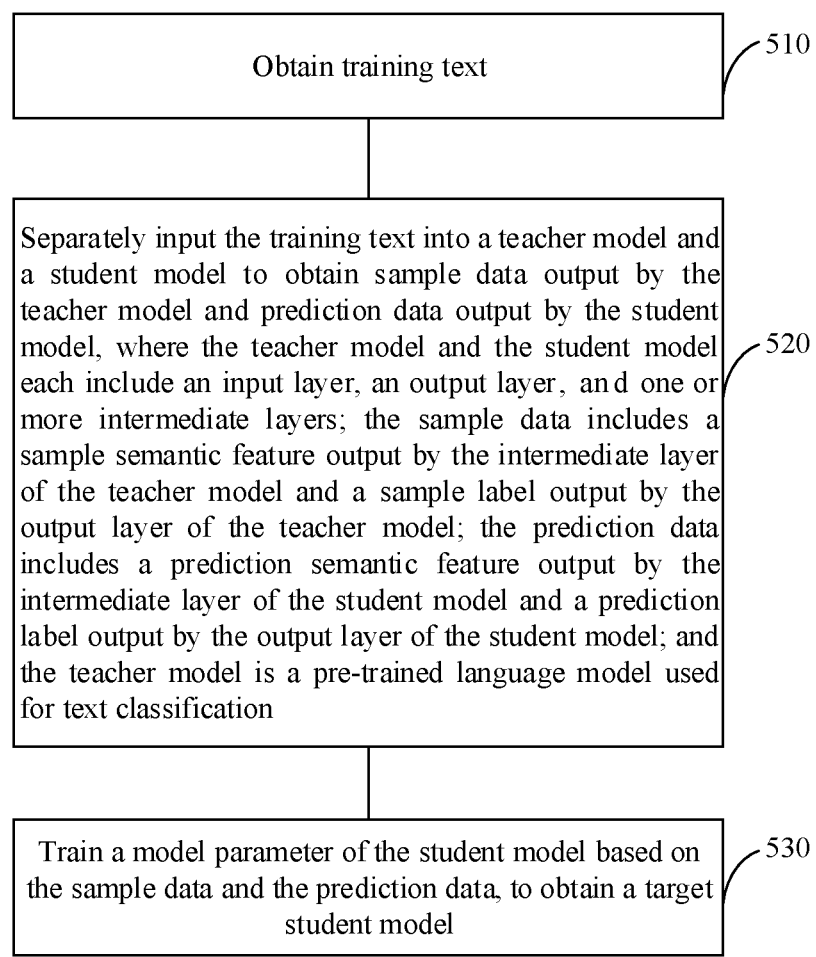
FIG. 8 is a schematic flowchart of a text processing model training method according to an embodiment of this disclosure.

FIG. 8 is a schematic flowchart of a text processing model training method according to an embodiment of this disclosure. The text processing model training method shown in FIG. 8 may be performed by a training apparatus. The training apparatus may be specifically the data processing device in FIG. 1, the user equipment in FIG. 2, the execution device 110 or the local device in FIG. 3, or the execution device 210 in FIG. 4. The method shown in FIG. 8 includes steps 510 to 530. The following separately describes steps 510 to 530 in detail.

It should be understood that the text processing model training method shown in FIG. 8 may be a knowledge distillation method used for a pre-trained language model.

Step 510: Obtain training text.

The training text may be any text sequence that conforms to language syntax rules, for example, news, encyclopedia, social media news, or literary works.

Label information may include any one of information indicating a classification result of the training text, sequence tagging information, or text translation label information. The classification result includes an emotion classification result of the training text or a semantic intention classification result of the training text.

For example, the training text may be training text including label information, and the label information may be used to indicate the classification result of the training text.

For example, the training text may be a piece of text input by a user, and the label information may be used to indicate the emotion classification result of the training text. The label information may include "0", "1", and "2", where "0" may be used to indicate that a user emotion classification result corresponding to the training text is depressed, "1" may be used to indicate that the user emotion classification result corresponding to the training text is angry, and "2" may be used to indicate that the user emotion classification result corresponding to the training text is happy.

Step 520: Separately input the training text into a teacher model and a student model to obtain sample data output by the teacher model and prediction data output by the student model, where the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing.

The model used for text processing may be a model used for text classification, or the model used for text processing may be a model used for text sequence tagging, or the model used for text processing may be a model used for text translation. It should be understood that the model used for text processing may be used for a natural language processing task. A specific implementation form of the model used for text processing is not limited in this embodiment of this disclosure.

For example, when the text processing model is a text classification model, the sample label may be an emotion classification label or an intention classification label corresponding to the training text. When the text processing model is a text sequence tagging model, the sample label may refer to tagging information corresponding to the text. For example, part-of-speech tagging is performed on the training text, and in this case, the sample label may refer to position information in an entire list of parts of speech. When the text processing model is a text translation model, the sample label may refer to position information of translated text of the training text in an entire word list.

It should be understood that the semantic features output by the intermediate layers of the teacher model and the student model may refer to intermediate output data of text processing, and the sample label or the prediction label output by the output layer may refer to a processing result output during text processing. The foregoing illustrates an optional representation form of the sample label. This is not limited in this embodiment of this disclosure.

It should be noted that the teacher model is a pre-trained language model obtained through training by using a large amount of training text, and the teacher model has a relatively strong semantic representation capability.

The intermediate layer of the teacher model may be any layer other than the input layer and the output layer of the teacher model. For example, the intermediate layer may be any transformer layer of the teacher model. Similarly, the intermediate layer of the student model may be any layer other than the input layer and the output layer of the student model. For example, the intermediate layer may be any transformer layer of the student model.

Step 530: Train a model parameter of the student model based on the sample data and the prediction data, to obtain a target student model.

In this embodiment of this disclosure, the teacher model may be a model that has a strong semantic representation capability and a large quantity of model parameters, and the student model may be a model that has a weak semantic representation capability and a small quantity of parameters. Because the teacher model has a relatively large quantity of model parameters, the teacher model cannot meet requirements of an intelligent terminal for a model size, a run time, and the like of a deployed model, that is, the teacher model generally cannot meet a model deployment requirement of the intelligent terminal and cannot be directly deployed on the intelligent terminal. The student model continuously learns the teacher model, so that the student model learns to imitate behavior of the teacher model to perform effective knowledge transfer, to obtain the target student model that can have a semantic representation capability the same as or similar to the semantic representation capability of the teacher model, and deploy, on the intelligent terminal, the target student model that meets the deployment requirement of the intelligent terminal.

Optionally, the training a model parameter of the student model based on the sample data and the prediction data, to obtain a target student model may include: training the intermediate layer of the student model based on the sample semantic feature and the prediction semantic feature; and training the output layer of the student model based on the sample label and the prediction label.

In this embodiment of this disclosure, the intermediate layer of the student model may be trained by using the sample semantic feature output by the intermediate layer of the teacher model and the prediction semantic feature output by the intermediate layer of the student model. The output layer of the student model may be trained based on the sample label output by the output layer of the teacher model and the prediction label output by the output layer of the student model. That is, in a process of training the student model, the student model may continuously fit the intermediate layer and the output layer of the teacher model, to perform effective knowledge transfer, so that the student model continuously learns the semantic representation capability of the teacher model.

It should be understood that training the intermediate layer of the student model based on the sample semantic feature output by the intermediate layer of the teacher model and the prediction semantic feature output by the intermediate layer of the student model may refer to continuously adjusting the model parameter of the student model through reverse iteration by using a difference between the sample semantic feature and the prediction semantic feature, so that the prediction semantic feature output by the intermediate layer of the student model keeps approaching the sample semantic feature, or the prediction semantic feature is approximately the same as the sample semantic feature. Similarly, training the output layer of the student model based on the sample label output by the output layer of the teacher model and the prediction label output by the output layer of the student model may refer to continuously adjusting the model parameter of the student model through reverse iteration by using a difference between the sample label and the prediction label, so that the prediction label output by the output layer of the student model keeps approaching the sample label, or the prediction label is approximately the same as the sample label. That is, the target student model obtained through training can have a text processing capability the same as or similar to a text processing capability of the teacher model, so that the teacher model with a relatively large quantity of parameters and a relatively large calculation amount is transferred to the miniaturized student model.

Further, to enable the student model to more effectively learn a semantic representation capability of the teacher model and improve knowledge distillation efficiency of the pre-trained language model, the student model and the teacher model may use a same model structure, thereby facilitating the student model in imitating the behavior of the teacher model, to perform effective knowledge transfer.

Optionally, the teacher model and the student model may be transformer models, the intermediate layer of the teacher model may include N transformer layers, and the intermediate layer of the student model may include M transformer layers; N is a positive integer greater than or equal to M, and the training the intermediate layer of the student model based on the sample semantic feature and the prediction semantic feature may include: selecting M transformer layers from the N transformer layers included in the teacher model, where each of the M transformer layers includes an attention mechanism module and a forward network module; and training an $i^{th}$ transformer layer of the student model based on a sample semantic feature output by an $i^{th}$ transformer layer of the teacher model and an attention score matrix in the attention mechanism module included in the $i^{th}$ transformer layer of the teacher model, where i is a positive integer less than or equal to M, and M is an integer greater than or equal to 1.

It should be noted that the teacher model and the student model may use the same transformer model shown in FIG.

5, but a quantity of transformer layers included in the teacher model may be greater than or equal to a quantity of transformer layers included in the student model.

Figure 9:
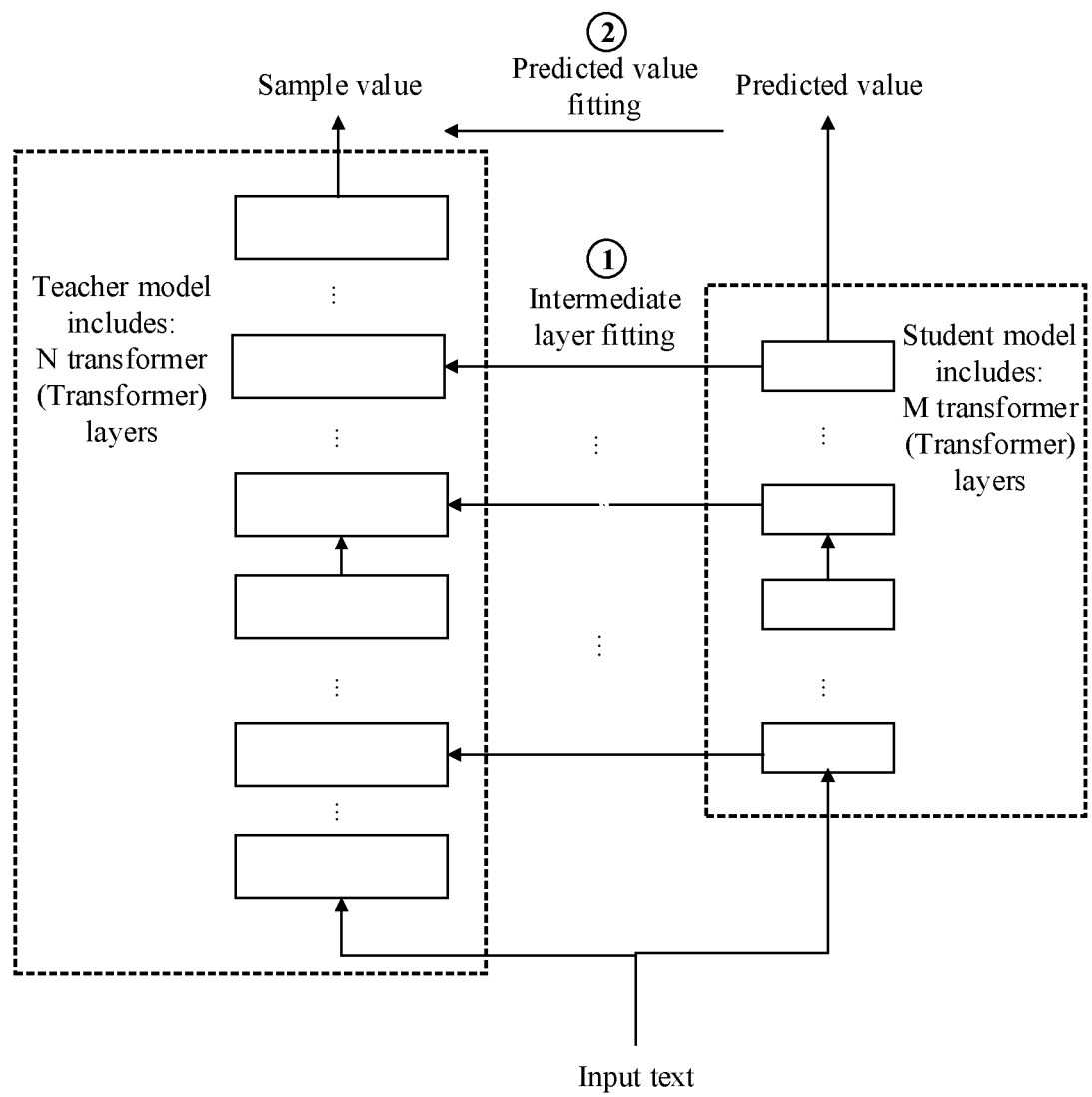
FIG. 9 is a schematic diagram of a training method based on a transformer (Transformer) layer according to an embodiment of this disclosure.

For example, FIG. 9 is a schematic diagram of a training method (namely, knowledge distillation) based on an intermediate layer and an output layer according to an embodiment of this disclosure. As shown in FIG. 9, the teacher model may include N transformer layers, the student model may include M transformer layers, and a specific structure of each transformer layer may be a specific structure of the transformer layer shown in FIG. 5. When fitting is performed on any transformer layer of the teacher model, the following steps may be included:

Step 1: Select M transformer layers from the N transformer layers of the teacher model, so that each transformer layer of the student model fits a corresponding transformer layer of the teacher model.

In an optional implementation, the M transformer layers may be selected from the teacher model by using a mapping function f(*). For example, f($S_i$) represents a fitted teacher layer corresponding to an $S_i$ layer of the student model.

For example, an average selection method or an equal-interval selection method may be used.

For example, it is assumed that the student model includes three transformer layers, and the teacher model includes 12 transformer layers. In this case, a first transformer layer of the student model may fit output data of a first transformer layer of the teacher model, a second transformer layer of the student model may fit output data of a fifth transformer layer of the teacher model, and a third transformer layer of the student model may fit output data of a ninth transformer layer of the teacher model. That is, the student model may select a transformer layer from the teacher model at equal intervals as a learning target.

Step 2: Perform knowledge distillation based on the transformer layers.

The knowledge distillation based on the transformer layers may include attention score matrix fitting and output representation (for example, semantic feature) fitting.

Figure 10:
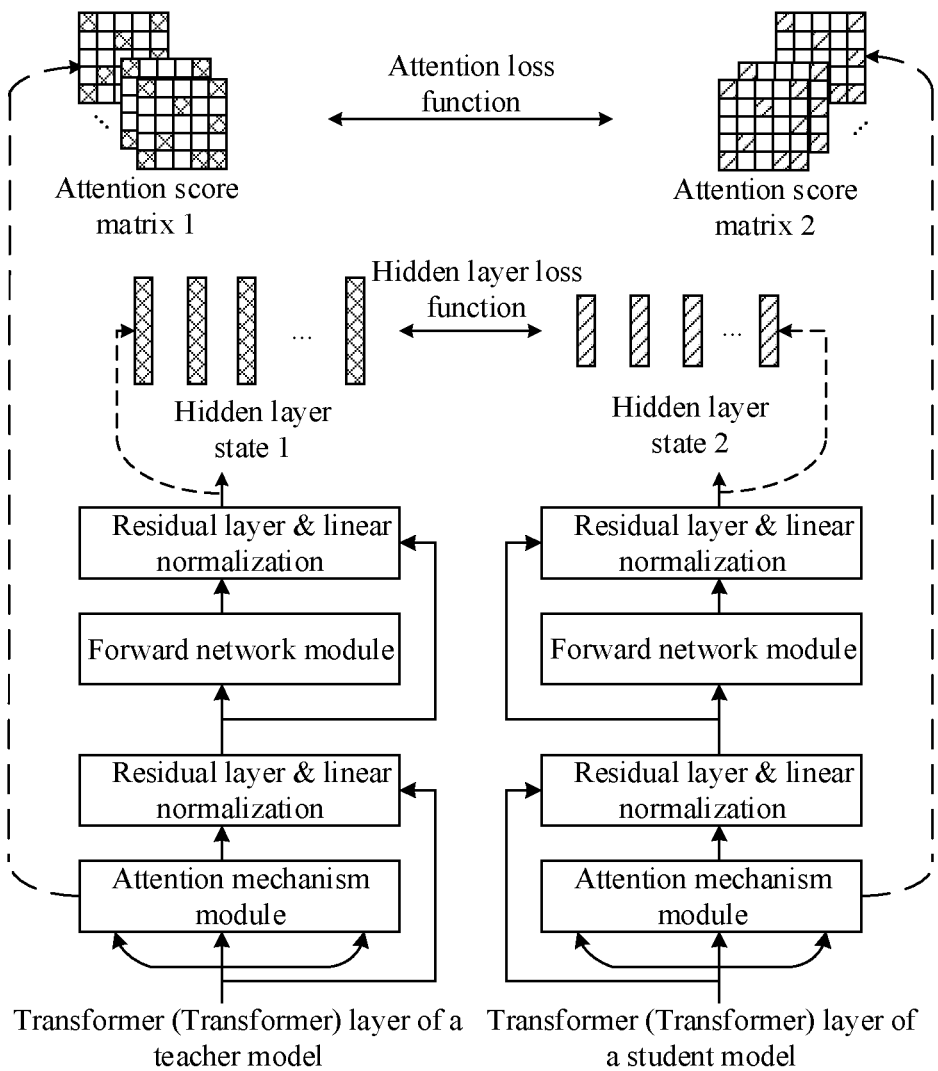
FIG. 10 is a schematic diagram of a training method based on a transformer (Transformer) layer according to an embodiment of this disclosure.

For example, as shown in FIG. 10, FIG. 10 is a schematic diagram of a training method (namely, knowledge distillation) based on an intermediate layer (for example, a transformer layer) according to an embodiment of this disclosure.

In this embodiment of this disclosure, for each layer, the student model may fit an attention score matrix of the teacher model and output representation of the layer. The attention score matrix may include rich information related to syntax, reference, and a task, and can explicitly reflect powerful semantic knowledge of a large-scale pre-trained language model (for example, the teacher model). By fitting the attention score matrix, the semantic knowledge of the large model can be effectively transferred to improve a semantic understanding capability of the student model.

For example, attention score matrix fitting may be performed by using a mean square error (mean square error, MSE) loss function: $L_{MSE}^{Att}(S_i^{Att}, T_{f(S_i)}^{Att})$, where $S_i^{Att}$, $T_{f(S_i)}^{Att} \in R^{h*l*l}$. $S_i^{Att}$ represents an attention score matrix of an $S_i^{th}$ transformer layer of the student model, $T_{f(S_i)}^{Att}$ represents an attention score matrix of an $f(S_i)^{th}$ transformer layer of the teacher model, and h and l respectively represent a quantity of attention mechanism calculations (head quantity) and a text length of the model.

The attention score matrix may be denoted by $$\frac{QK}{\sqrt{d}},$$

where Q, $K \in R^{l*d}$ are two matrices obtained through different linear transformation based on input representation (for example, semantic feature) calculation, and d represents a quantity of dimensions of input representation.

For example, in this embodiment of this disclosure, the MSE loss function may be used to fit output representation of a transformer layer. Fitting of an $S_i^{th}$ layer of the student model corresponding to an $f(S_i)^{th}$ layer of the teacher model is as follows:

$$L_{MSE}^{Hidn}(S_i^{Hidn}W, T_{f(S_i)}^{Hidn}).$$

$S_i^{Hidn}$ represents a status of an $S_i^{th}$ hidden layer of the student model, and $T_{f(S_i)}^{Hidn}$ represents a status of an $f(S_i)^{th}$ hidden layer of the teacher model. Because representation dimensions of the student model are less than representation dimensions of the teacher model, linear transformation W needs to be used to increase representation dimensions of the student model to be the same as representation dimensions of the teacher model.

For example, the MSE loss function is used to fit the transformer layer, and a fitting objective of the transformer layer may be: $L_{MSE}^{Layer} = L_{MSE}^{Att} + L_{MSE}^{Hidn}$.

Step 3: Fit the output layer.

It is assumed that an original training text set is $D^{org} = \{x_i, y_i\} (1 \leq i \leq |D^{org}|)$, an enhanced text set is $D^{arg} = \{x_i\} (1 \leq i \leq |D^{arg}|)$, and input text $\{x_i\}$ is obtained by combining the two text sets. The teacher model is used to predict the input text, and predicted label information (logit value) is recorded. A final text set is $D = \{x_i, y'_i\}(1 \leq i \leq |D|)$. The MSE loss function is used to perform fitting learning on predicted values output by the model:

$$\frac{1}{|D|} \sum_{i=1}^{|D|} L_{MSE}(S(x_i), y'_i).$$

A model that performs best on a verification text set is selected as a final student model.

It should be noted that the enhanced text set is obtained by performing partial replacement on the original text set, and is to be described in more detail with reference to FIG. 11 and FIG. 12.

Currently, most data enhancement algorithms (such as a replacement method based on TF-IDF and a word vector) ignore context semantic information of given text. As a result, replacement text obtained by using the data enhancement algorithm has problems such as incoherent sentences, poor text quality, and limited text expansion.

Further, in a data enhancement method based on a pre-trained language model proposed in this disclosure, context information can be well encoded by using the data enhancement method in this embodiment of this disclosure, and appropriate replacement text can be generated by using the context information, so that the replacement text has smoother syntax and higher quality.

Optionally, the training text used for training the student model may be an enhanced text set, and the text processing model training method further includes: performing partial word replacement on an obtained original text set to obtain a replacement text set; and obtaining the enhanced text set based on the original text set and the replacement text set, where each piece of training text in the enhanced text set includes label information, and the label information includes any one of information indicating a classification result of the training text, sequence tagging information, or text translation label information; and the classification result includes an emotion classification result of the training text or a semantic intention classification result of the training text.

The label information may be used to indicate the emotion classification result or a semantic intention of the training text. For example, the label information may include "0", "1", and "2", where "0" may be used to indicate that a user emotion classification result corresponding to the training text is depressed, "1" may be used to indicate that the user emotion classification result corresponding to the training text is angry, and "2" may be used to indicate that the user emotion classification result corresponding to the training text is happy.

It should be noted that label information of any text in the original text set may be manually tagged label information, and label information of any replacement text in the replacement text set may be a predicted classification result of the replacement text, namely, predicted label information, which is obtained by inputting the generated replacement text into the teacher model.

Optionally, the performing partial word replacement on an obtained original text set to obtain a replacement text set includes: obtaining first text, where the first text is any text in the original text set; determining a replacement position of a word in the first text based on a replacement threshold of each word in the first text; masking one or more words at the replacement position to generate masked text; and inputting the masked text into a pre-trained language model to obtain replacement text of the first text.

For example, one or more words at the replacement position are masked to generate masked text, and the masked text is input into a pre-trained language model to obtain replacement text of the first text.

Optionally, the inputting the masked text into a pre-trained language model to obtain replacement text of the first text may include: inputting the masked text into the pre-trained language model to obtain the replacement text of the first text by using a greedy algorithm and/or a beam search algorithm.

Figure 11:
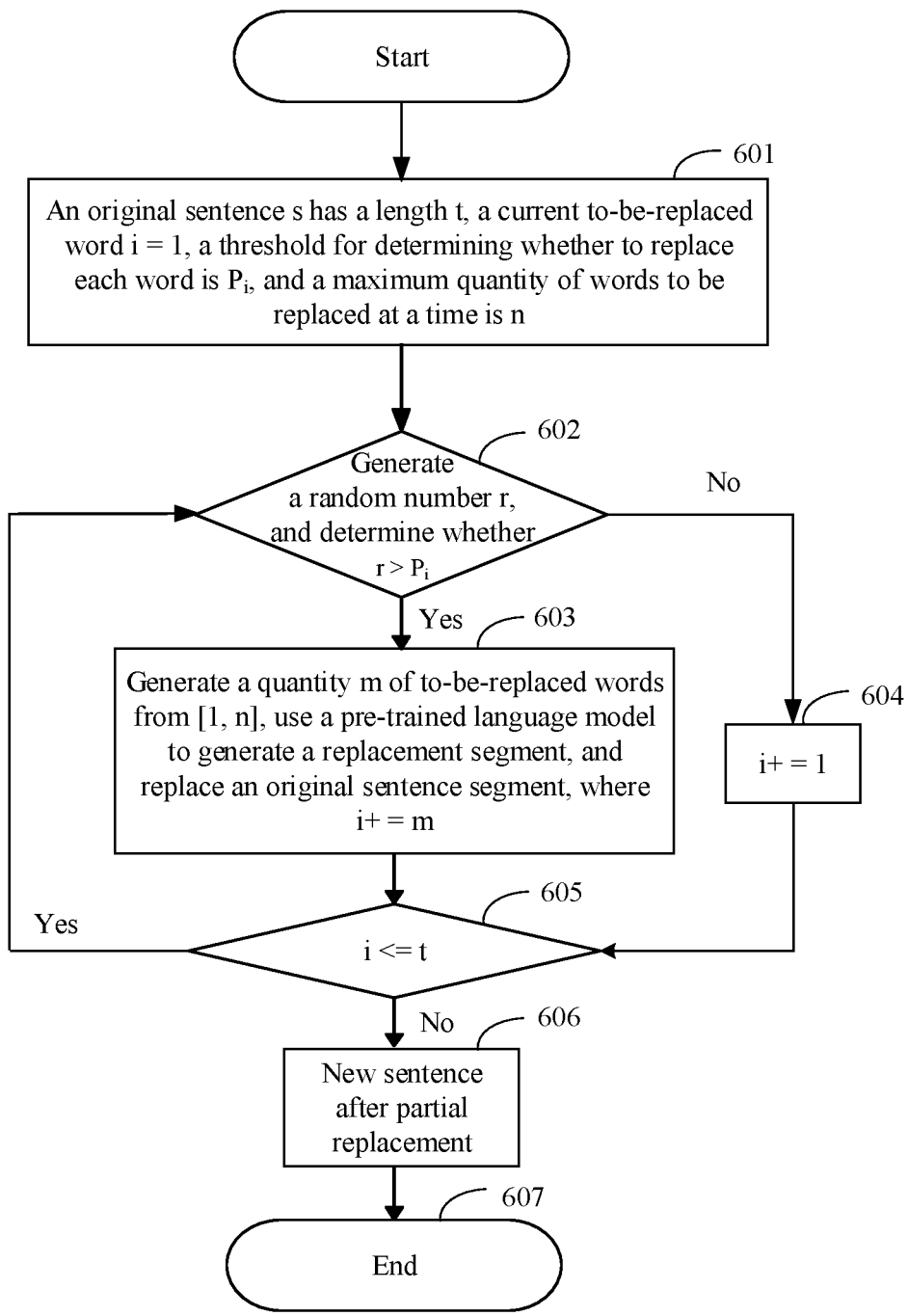
FIG. 11 is a schematic diagram of a method for performing data enhancement on an original text set according to an embodiment of this disclosure.

For example, FIG. 11 is a schematic diagram of a data enhancement method based on a pre-trained language model according to an embodiment of this disclosure. As shown in FIG. 11, a data enhancement method 600 includes step 601 to step 607. The following describes step 601 to step 607 in detail.

Step 601: Input a piece of text (for example, a sentence S), where the text includes t words, a threshold $P_i$ for replacing each of the t words is set, a maximum quantity of words to be replaced at a time is n, i is used as a subscript of a current word, and i is initialized to 1.

For example, it is assumed that the input text is "Please book me a plane ticket from Beijing to Shanghai".

Step 602: Generate a random number r ranging from 0 to 1, and determine whether r is greater than a threshold $P_i$ of an $i^{th}$ word. If r>$P_i$, the $i^{th}$ word is replaced, and step 603 is performed. Otherwise, step 604 is performed to add 1 to the word subscript, that is, i+=1, and whether the current word is the last word is determined, that is, step 605 is performed.

Step 603: Generate a quantity m of to-be-replaced words from an interval [1, n], use the pre-trained language model to generate a replacement segment, replace an original sentence segment, and update the subscript by i+=m.

Step 605: Determine whether the entire sentence is fully traversed, that is, whether i<=t is met. If the condition is met, return to step 602. If the condition is not met, perform step 606 to output a new sentence after partial replacement.

Step 607: End the procedure.

Figure 12:
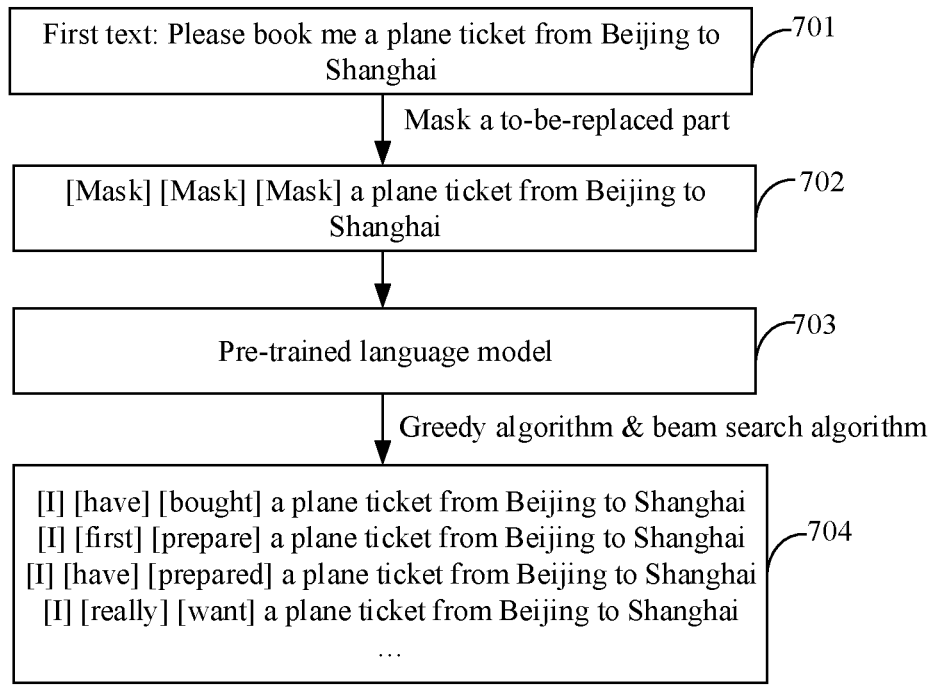
FIG. 12 is a schematic diagram of performing partial replacement processing on training text according to an embodiment of this disclosure.

For example, FIG. 12 is a schematic flowchart of a method for generating replacement text according to an embodiment of this disclosure.

Step 701: Current input text is "Please book me a plane ticket from Beijing to Shanghai". It is assumed that by performing step 601 and step 602, it is determined that the first word in the current input text needs to be replaced, and a generated quantity m of to-be-replaced words is 3.

Step 702: Mask a replacement position in the current input text to generate masked text.

For example, the generated masked text is "[Mask] [Mask] [Mask] a plane ticket from Beijing to Shanghai".

Step 703: Input the obtained masked text into a pre-trained language model for text replacement.

For example, the masked text "[Mask] [Mask] [Mask] a plane ticket from Beijing to Shanghai" is input into the pre-trained language model (for example, a BERT model).

It should be understood that the pre-trained language model may be different from the teacher model and the student model, and the pre-trained language model is used to perform text replacement. For example, the pre-trained language model may be a BERT model.

For example, the masked text may be input into the pre-trained language model to generate a plurality of new sentences by using a greedy algorithm and/or a beam search algorithm, to generate replacement text.

Specifically, the pre-trained language model BERT is used to predict all [Mask] symbols each time, then probabilities of candidate words corresponding to all [Mask] symbols are uniformly compared, and a candidate word with a largest probability is selected to replace a [Mask] symbol. This is repeated for m times until all [Mask] symbols are replaced.

Step 704: Output the replacement text.

For example, generated replacement text corresponding to the input text "Please book me a plane ticket from Beijing to Shanghai" may include "[I] [have] [bought] a plane ticket from Beijing to Shanghai", "[I] [first] [prepare] a plane ticket from Beijing to Shanghai", "[I] [have] [prepared] a plane ticket from Beijing to Shanghai", "[I] [really] [want] a plane ticket from Beijing to Shanghai", and the like.

It should be noted that one piece of input text in the original text set is used as an example for description. In this embodiment of this disclosure, the foregoing operations may be performed on each sentence in the training text set, to generate new data, namely, replacement text. Context information can be well encoded by using the method for generating replacement text provided in this embodiment of this disclosure, and appropriate replacement text can be generated by using the context information, so that the replacement text has smoother syntax and higher quality.

In an optional implementation, the training text used for training the student model may be an enhanced text set obtained by using FIG. 11 and FIG. 12. Any piece of training text in the enhanced text set may include label information, and the label information is used to indicate a classification result of the training text. The training text may be text for different classification applications. For example, the training text may be text for emotion classification, or the training text may be text for intention classification.

Figure 13:
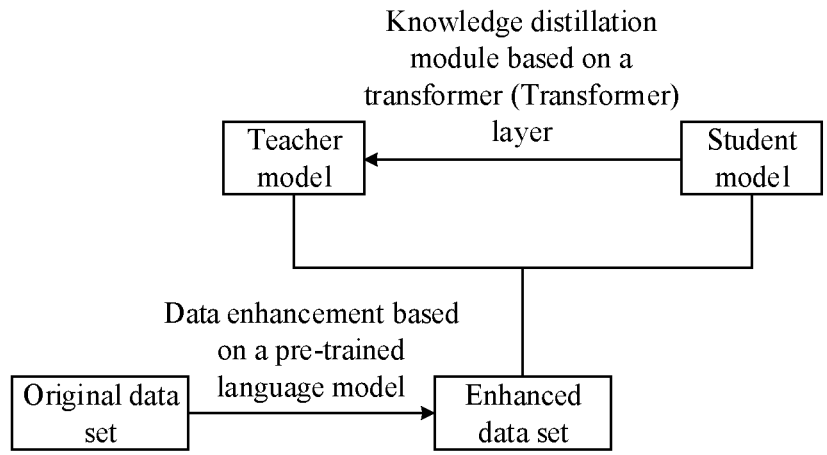
FIG. 13 is a schematic diagram of training a text processing model for a specific task according to an embodiment of this disclosure.

For example, FIG. 13 is a knowledge distillation method for a specific task (for example, different classification applications) according to an embodiment of this disclosure. The student model may use a same transformer structure as the teacher model, and the student model may be directly trained by using training data for a specific task, to obtain a target student model for the specific task. As shown in FIG. 13, a task-specific distillation solution includes two steps:

Step 1: Perform data enhancement processing on an original text set by using a pre-trained language model, that is, expand training data for a specific task to obtain new data.

It should be understood that the specific task may refer to different classification applications. For example, the specific task may refer to an emotion classification application or an intention classification application.

For example, each piece of training text in the original text set may include label information, and the label information may be used to indicate a user emotion classification result corresponding to the training text. After data enhancement processing is performed on the original text set, a replacement text set is obtained, and predicted label information of replacement text may be obtained by inputting the replacement text into the teacher model. The predicted label information may be used to indicate a user emotion classification result corresponding to the replacement text. An enhanced text set used for emotion classification may be obtained by combining the original text set and the replacement text set.

When training text included in the enhanced text set is data used for emotion classification, the target student model obtained through training may be used to perform emotion classification on to-be-processed text.

For example, each piece of training text in the original text set may include label information, and the label information may be used to indicate a user intention classification result corresponding to the training text. After data enhancement processing is performed on the original text set, a replacement text set is obtained, and predicted label information of replacement text may be obtained by inputting the replacement text into the teacher model. The predicted label information may be used to indicate a user intention classification result corresponding to the replacement text. An enhanced text set used for intention classification may be obtained by combining the original text set and the replacement text set.

When training text included in the enhanced text set is data used for intention classification, the target student model obtained through training may be used to perform intention classification on to-be-processed text.

It should be understood that, for a specific procedure of performing partial replacement on the training text in the original text set to obtain the enhanced text set, refer to the procedures in FIG. 11 and FIG. 12. Details are not described herein.

Step 2: Perform knowledge transfer on the enhanced text set by using a knowledge distillation algorithm based on a transformer layer, to obtain the target student model.

For example, for the knowledge distillation algorithm based on a transformer layer, refer to the specific procedures in FIG. 9 and FIG. 10.

In this embodiment of this disclosure, target student models based on different classification tasks are obtained by using training text of different classification applications and a knowledge distillation method of a transformer layer. Specifically, the student model may fit a task-specific attention score matrix of a transformer layer of the teacher model and output representation of the layer. The attention score matrix may include rich information related to syntax, reference, and a task, and can explicitly reflect powerful semantic knowledge of a large-scale pre-trained language model (for example, the teacher model). Therefore, by using the knowledge distillation method based on a transformer layer, the semantic knowledge of the large model can be effectively transferred to improve a task-specific semantic understanding capability of the student model.

Figure 14:
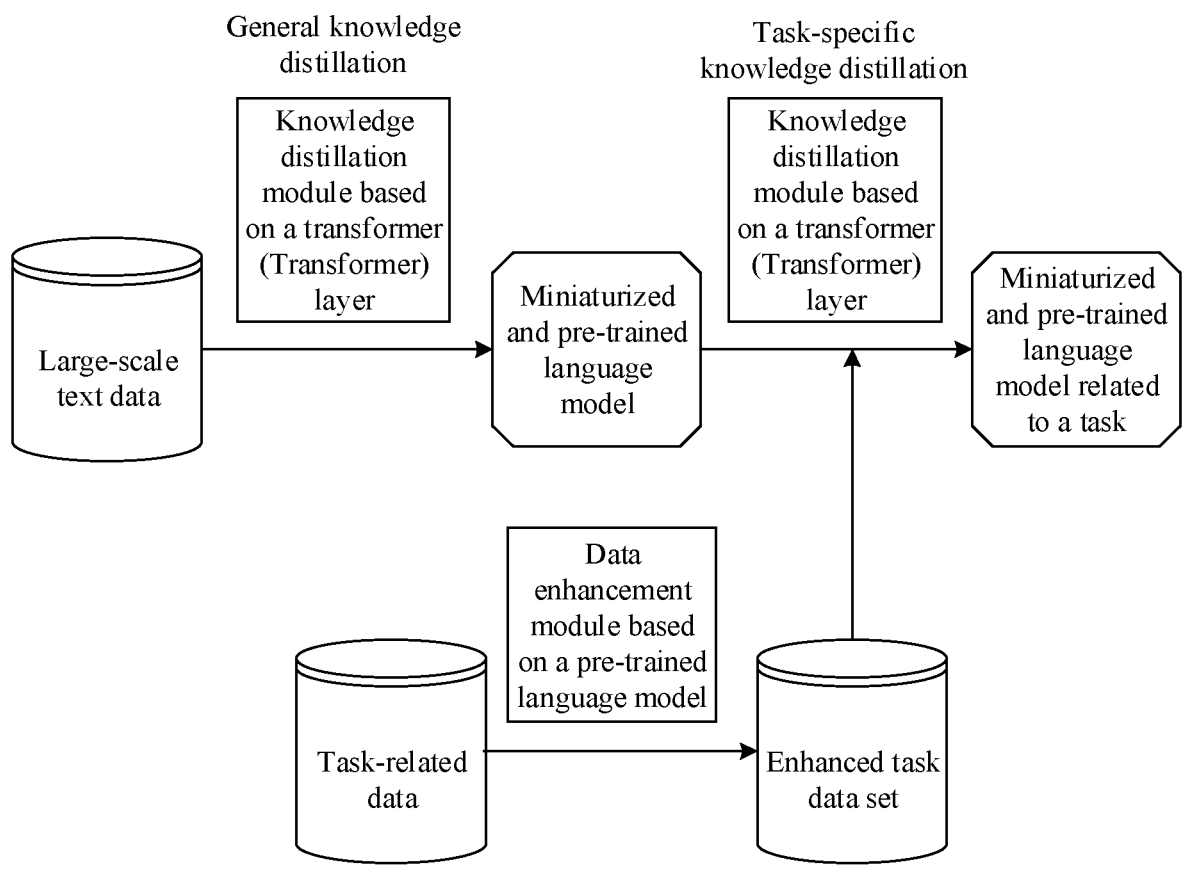
FIG. 14 is a schematic diagram of a two-step knowledge distillation method according to an embodiment of this disclosure.

In an optional implementation, FIG. 14 is a knowledge distillation method for a specific task according to an embodiment of this disclosure.

It should be noted that the knowledge distillation method for a specific task shown in FIG. 13 may be considered as a one-step distillation method. That is, training data for different application scenarios is directly used to train the student model, to obtain a target student model for processing a specific task.

The knowledge distillation method for a specific task shown in FIG. 14 may include a two-step distillation method. A first step is a general distillation process. That is, a miniaturized student model is obtained through training by using a large-scale text corpus (including no label information). A second step is a task-specific knowledge distillation process. That is, the student model is trained by using an enhanced text set (including label information) for a specific task, to obtain a target student model for the specific task.

Optionally, the two-step knowledge distillation method may include the following procedure:

Step 1: Obtain initial training text, where the initial training text does not include label information; separately input the initial training text into an initial teacher model and an initial student model to obtain an initial sample semantic feature output by an intermediate layer of the initial teacher model and an initial prediction semantic feature output by an intermediate layer of the initial student model, where the teacher model is obtained by training the initial teacher model with the training text; and train a model parameter of the initial student model based on the initial sample semantic feature and the initial prediction semantic feature, to obtain the student model.

For example, the initial teacher model and the initial student model may be transformer models, the intermediate layer of the initial teacher model includes N transformer layers, and the intermediate layer of the initial student model includes M transformer layers; and the training a model parameter of the initial student model based on the initial sample semantic feature and the initial prediction semantic feature includes:

selecting M transformer layers from the N transformer layers included in the initial teacher model, where each of the M transformer layers includes an attention mechanism module and a forward network module; and training an $i^{th}$ transformer layer of the initial student model based on a sample semantic feature output by an $i^{th}$ transformer layer of the M transformer layers of the initial teacher model and an attention score matrix in the attention mechanism module included in the $i^{th}$ transformer layer, where N is a positive integer greater than or equal to M, i is a positive integer less than or equal to M, and M is an integer greater than or equal to 1.

Step 2: Obtain training text, where the training text includes label information, and the label information may include any one of information indicating a classification result of the training text, sequence tagging information, or text translation label information; the classification result includes an emotion classification result of the training text or a semantic intention classification result of the training text; separately input the training text into a teacher model and a student model to obtain sample data output by the teacher model and prediction data output by the student model, where the sample data includes a sample semantic feature output by an intermediate layer of the teacher model and a sample label output by an output layer of the teacher model; the prediction data includes a prediction semantic feature output by an intermediate layer of the student model and a prediction label output by an output layer of the student model; and the teacher model is a pre-trained language model used for text classification; and train a parameter of the student model based on the sample data and the prediction data, to obtain a target student model.

The teacher model is obtained by training the initial teacher model by using the training text.

For example, the training text in step 2 may refer to an original text set, or may refer to an enhanced text set obtained after partial replacement is performed on the original text set.

It should be noted that a general distillation algorithm and a task-specific distillation algorithm may complement each other. The general distillation algorithm may be used to provide a good initial student model for task-specific distillation. The task-specific distillation algorithm enables the initial student model to further focus on learning a task-specific semantic representation capability of the teacher model.

In this embodiment of this disclosure, a general distillation process (General Distillation) may be first used to perform general knowledge distillation based on a large-scale text corpus and a distillation algorithm of a transformer layer to obtain a miniaturized and pre-trained language model; then, a task-specific distillation process (Task-specific Distillation) may be used, that is, more enhanced data may be obtained from an original data set by using a data enhancement module, and by using the enhanced data as data input of a knowledge distillation algorithm, knowledge distillation is performed based on the transformer layer to obtain the target student model with semantic representation similar to semantic representation of the teacher model and significantly fewer model parameters.

Figure 15:
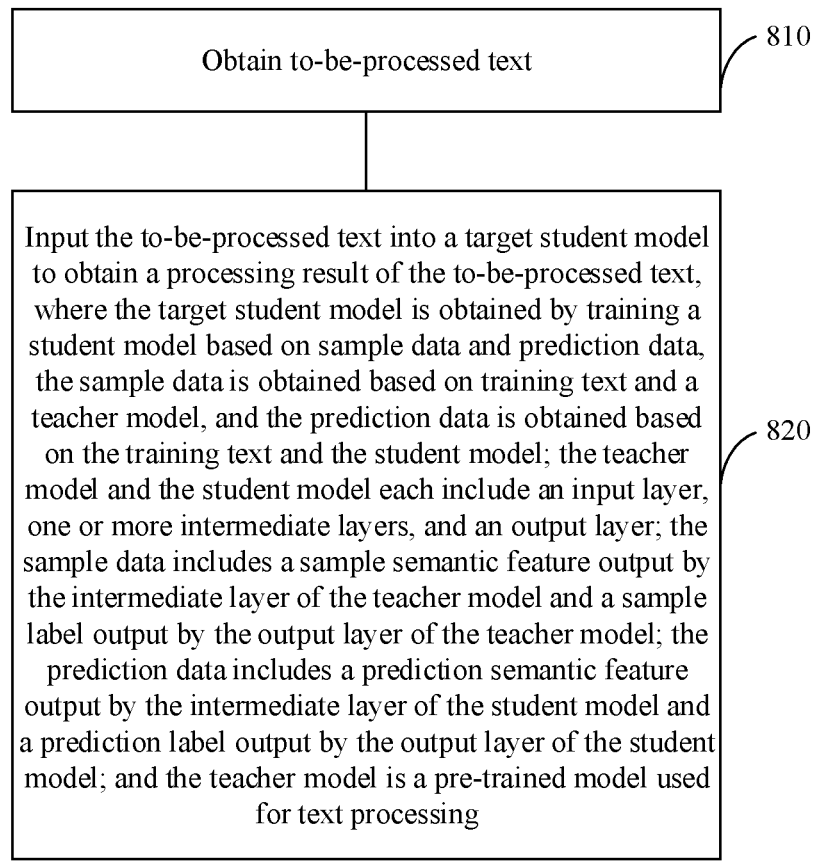
FIG. 15 is a schematic flowchart of a text processing method according to an embodiment of this disclosure.

FIG. 15 is a schematic flowchart of a text processing method according to an embodiment of this disclosure. The method shown in FIG. 15 may be performed by a text processing apparatus, and the text processing apparatus may be specifically the data processing device in FIG. 1, the user equipment in FIG. 2, the execution device 110 or the local device in FIG. 3, or the execution device 210 in FIG. 4. The method shown in FIG. 15 includes step 810 and step 820. The following separately describes step 810 and step 820 in detail.

Step 810: Obtain to-be-processed text.

The to-be-processed text may be any text sequence that conforms to language syntax rules. For example, the to-be-processed text may be a piece of text in news, encyclopedia, social media news, or literary works.

Step 820: Input the to-be-processed text into a target student model to obtain a processing result of the to-be-processed text, where the target student model is obtained by training a student model based on sample data and prediction data, the sample data is obtained based on training text and a teacher model, and the prediction data is obtained based on the training text and the student model; the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing.

It should be understood that the target student model may be a model obtained by using the training methods shown in FIG. 8 to FIG. 14. For a specific procedure, refer to FIG. 8 to FIG. 14.

For example, the target student model may be a model used for text classification, and the to-be-processed text is input into the target student model for classification processing, to obtain a classification result of the to-be-processed text.

For example, the target student model may be a model used for text sequence tagging, and the to-be-processed text is input into the target student model for sequence tagging processing, to obtain sequence tagging of the to-be-processed text.

For example, the target student model may be a model used for text translation, and the to-be-processed text is input into the target student model for translation processing, to obtain translated text of the to-be-processed text.

It should be noted that the target student model provided in this embodiment of this disclosure is also applicable to the extension, limitation, explanation, and description of related content of the target student model in related embodiments in FIG. 8 to FIG. 14. Details are not described herein.

For example, the target student model may be a model used for text emotion classification, or the target student model may be a model used for text intention classification, or the target student model may be a model used for text translation.

Optionally, in an embodiment, an intermediate layer of the target student model is obtained through training based on the sample semantic feature and the prediction semantic feature; and an output layer of the target student model is obtained through training based on the sample label and the prediction label.

Optionally, in an embodiment, the teacher model and the student model are transformer models, the intermediate layer of the teacher model includes N transformer layers, and the intermediate layer of the student model includes M transformer layers; each of the M transformer layers includes an attention mechanism module and a forward network module; a model parameter of an $i^{th}$ transformer layer of the target student model is obtained through training based on a sample semantic feature output by an $i^{th}$ transformer layer of M transformer layers of the teacher model and an attention score matrix in the attention mechanism module included in the $i^{th}$ transformer layer of the teacher model; and the M transformer layers of the teacher model are selected from the N transformer layers of the teacher model, where N is a positive integer greater than or equal to M, i is a positive integer less than or equal to M, and M is an integer greater than or equal to 1.

Optionally, in an embodiment, the training text is an enhanced text set, each piece of training text in the enhanced text set includes label information, and the label information is used to indicate any one of a classification result of the training text, a sequence tagging label, or a text translation label; the classification result includes an emotion classification result of the training text or a semantic intention classification result of the training text; and the enhanced text set is obtained based on an obtained original text set and a replacement text set, and the replacement text set is obtained by performing partial word replacement on the original text set.

Optionally, in an embodiment, the replacement text set includes replacement text of first text, the first text is any text in the original text set, and the replacement text of the first text is obtained by inputting masked text into a pre-trained language model; and the masked text is obtained by masking one or more words at a replacement position in the first text, and the replacement position is determined based on a replacement threshold of each word in the first text.

Optionally, in an embodiment, the replacement text of the first text is obtained by using a greedy algorithm and/or a beam search algorithm by inputting the masked text into the pre-trained language model.

Optionally, in an embodiment, the training text includes the label information, and the student model is obtained by training an initial student model based on an initial sample semantic feature and an initial prediction semantic feature; and the initial sample semantic feature is output data that is of an intermediate layer of an initial teacher model and that is obtained by inputting initial training text into the initial teacher model, the prediction semantic feature is output data that is of an intermediate layer of the initial student model and that is obtained by inputting the initial training text into the initial student model, and the initial training text does not include label information.

Optionally, in an embodiment, the label information includes any one of information indicating a classification result of the training text, sequence tagging information, or text translation label information. The classification result includes an emotion classification result of the training text or a semantic intention classification result of the training text.

Optionally, in an embodiment, the initial teacher model and the initial student model are transformer models, the intermediate layer of the initial teacher model includes N transformer layers, and the intermediate layer of the initial student model includes M transformer layers; each of the M transformer layers includes an attention mechanism module and a forward network module; a model parameter of an $i^{th}$ transformer layer of the initial student model is obtained through training based on a sample semantic feature output by an $i^{th}$ transformer layer of M transformer layers of the initial teacher model and an attention score matrix in the attention mechanism module included in the $i^{th}$ transformer layer of the initial teacher model; and the M transformer layers of the initial teacher model are selected from the N transformer layers of the teacher model, where N is a positive integer greater than or equal to M, i is a positive integer less than or equal to M, and M is an integer greater than or equal to 1.

In this embodiment of this disclosure, the pre-trained target student model is obtained by continuously learning output data of the intermediate layer and the output layer of the teacher model, so that the target student model more accurately learns semantic representation of the teacher model to implement effective knowledge transfer, thereby improving accuracy of a text processing result of the target student model.

It should be noted that the foregoing example description is merely intended to help a person skilled in the art understand the embodiments of this disclosure, instead of limiting the embodiments of this disclosure to the illustrated specific value or specific scenario. A person skilled in the art definitely can make various equivalent modifications or changes based on the examples described above, and such modifications or changes also fall within the scope of the embodiments of this disclosure.

The foregoing describes in detail the text processing model training method and the text processing method in the embodiments of this disclosure with reference to FIG. 1 to FIG. 15. The following describes in detail apparatus embodiments of this disclosure with reference to FIG. 16 to FIG. 19. It should be understood that a text processing model training apparatus in the embodiments of this disclosure may perform the foregoing text processing model training method in the embodiments of this disclosure, and a text processing apparatus may perform the foregoing text processing method in the embodiments of this disclosure. That is, for specific working processes of the following products, refer to the corresponding processes in the foregoing method embodiments.

Figure 16:
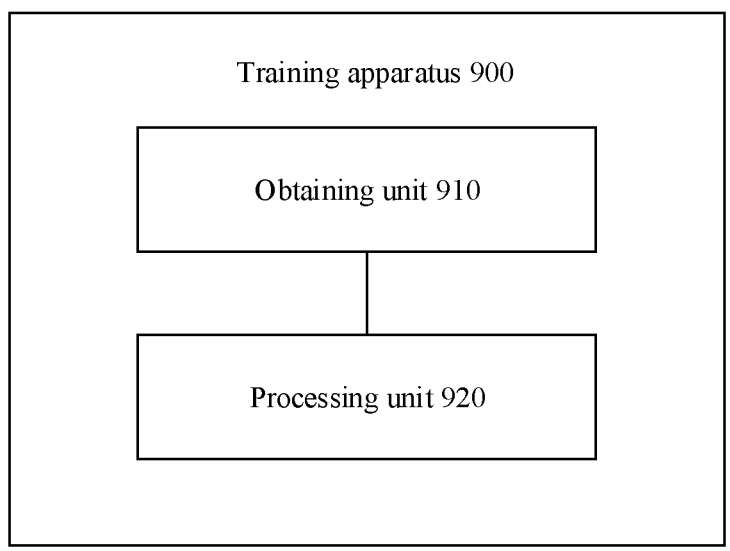
FIG. 16 is a schematic diagram of a text processing model training apparatus according to an embodiment of this disclosure.

FIG. 16 is a schematic block diagram of a text processing model training apparatus according to an embodiment of this disclosure. It should be understood that a training apparatus 900 may perform the text processing model training methods shown in FIG. 8 to FIG. 14. The training apparatus 900 includes an obtaining unit 910 and a processing unit 920.

The obtaining unit 910 is configured to obtain training text. The processing unit 920 is configured to separately input the training text into a teacher model and a student model to obtain sample data output by the teacher model and prediction data output by the student model, where the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing; and train a model parameter of the student model based on the sample data and the prediction data, to obtain a target student model.

Optionally, in an embodiment, the processing unit 920 is specifically configured to:

train the intermediate layer of the student model based on the sample semantic feature and the prediction semantic feature; and train the output layer of the student model based on the sample label and the prediction label.

Optionally, in an embodiment, the teacher model and the student model are transformer models, the intermediate layer of the teacher model includes N transformer layers, and the intermediate layer of the student model includes M transformer layers. The processing unit 920 is specifically configured to:

select M transformer layers from the N transformer layers included in the teacher model, where each of the M transformer layers includes an attention mechanism module and a forward network module; and train an $i^{th}$ transformer layer of the student model based on a sample semantic feature output by an $i^{th}$ transformer layer of the M transformer layers of the teacher model and an attention score matrix in the attention mechanism module included in the $i^{th}$ transformer layer of the teacher model, where i is a positive integer less than or equal to M, and M is an integer greater than or equal to 1.

Optionally, in an embodiment, the training text is an enhanced text set, and the processing unit 920 is further configured to:

perform partial word replacement on an obtained original text set to obtain a replacement text set; and obtain the enhanced text set based on the original text set and the replacement text set, where each piece of training text in the enhanced text set includes label information, and the label information includes any one of information indicating a classification result of the training text, sequence tagging information, or text translation label information; and the classification result includes an emotion classification result of the training text or a semantic intention classification result of the training text.

Optionally, in an embodiment, the processing unit 920 is specifically configured to:

obtain first text, where the first text is any text in the original text set;

determine a replacement position of a word in the first text based on a replacement threshold of each word in the first text;

mask one or more words at the replacement position to generate masked text; and input the masked text into a pre-trained language model to obtain replacement text of the first text.

Optionally, in an embodiment, the processing unit 920 is specifically configured to:

input the masked text into the pre-trained language model to obtain the replacement text of the first text by using a greedy algorithm and/or a beam search algorithm.

Optionally, in an embodiment, the training text includes the label information, and the teacher model is obtained by training an initial teacher model with the training text. The obtaining unit 910 is further configured to obtain initial training text, where the initial training text does not include label information.

The processing unit 920 is further configured to separately input the initial training text into the initial teacher model and an initial student model to obtain an initial sample semantic feature output by an intermediate layer of the initial teacher model and an initial prediction semantic feature output by an intermediate layer of the initial student model; and train a model parameter of the initial student model based on the initial sample semantic feature and the initial prediction semantic feature, to obtain the student model.

Optionally, in an embodiment, the initial teacher model and the initial student model are transformer models, the intermediate layer of the initial teacher model includes N transformer layers, and the intermediate layer of the initial student model includes M transformer layers. The processing unit 920 is specifically configured to: select M transformer layers from the N transformer layers included in the initial teacher model, where each of the M transformer layers includes an attention mechanism module and a forward network module; and train an $i^{th}$ transformer layer of the initial student model based on a sample semantic feature output by an $i^{th}$ transformer layer of the M transformer layers of the initial teacher model and an attention score matrix in the attention mechanism module included in the $i^{th}$ transformer layer of the initial teacher model, where i is a positive integer less than or equal to M, and M is an integer greater than or equal to 1.

Figure 17:
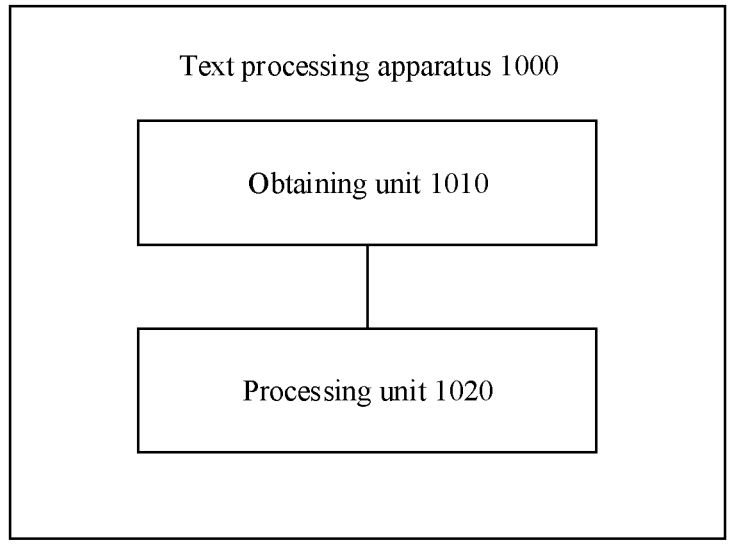
FIG. 17 is a schematic block diagram of a text processing apparatus according to an embodiment of this disclosure.

FIG. 17 is a schematic block diagram of a text processing apparatus according to an embodiment of this disclosure. It should be understood that a text processing apparatus 1000 may perform the text processing method shown in FIG. 15. The text processing apparatus 1000 includes an obtaining unit 1010 and a processing unit 1020.

The obtaining unit 1010 is configured to obtain to-be-processed text. The processing unit 1020 is configured to input the to-be-processed text into a target student model to obtain a processing result of the to-be-processed text, where the target student model is obtained by training a student model based on sample data and prediction data, the sample data is obtained based on training text and a teacher model, and the prediction data is obtained based on the training text and the student model; the teacher model and the student model each include an input layer, one or more intermediate layers, and an output layer; the sample data includes a sample semantic feature output by the intermediate layer of the teacher model and a sample label output by the output layer of the teacher model; the prediction data includes a prediction semantic feature output by the intermediate layer of the student model and a prediction label output by the output layer of the student model; and the teacher model is a pre-trained model used for text processing.

Optionally, in an embodiment, an intermediate layer of the target student model is obtained through training based on the sample semantic feature and the prediction semantic feature; and an output layer of the target model is obtained through training based on the sample label and the prediction label.

Optionally, in an embodiment, the teacher model and the student model are transformer models, the intermediate layer of the teacher model includes N transformer layers, and the intermediate layer of the student model includes M transformer layers; each of the M transformer layers includes an attention mechanism module and a forward network module; an $i^{th}$ transformer layer of the target student model is obtained through training based on a sample semantic feature output by an $i^{th}$ transformer layer of M transformer layers of the teacher model and an attention score matrix in the attention mechanism module included in the $i^{th}$ transformer layer of the teacher model; and the M transformer layers of the teacher model are selected from the N transformer layers of the teacher model, where N is a positive integer greater than or equal to M, i is a positive integer less than or equal to M, and M is an integer greater than or equal to 1.

Optionally, in an embodiment, the training text is an enhanced text set, each piece of training text in the enhanced text set includes label information, and the label information includes any one of information indicating a classification result of the training text, sequence tagging information, or text translation label information; the classification result includes an emotion classification result of the training text or a semantic intention classification result of the training text; and the enhanced text set is obtained based on an obtained original text set and a replacement text set, and the replacement text set is obtained by performing partial word replacement on the original text set.

Optionally, in an embodiment, the replacement text set includes replacement text of first text, the first text is any text in the original text set, and the replacement text of the first text is obtained by inputting masked text into a pre-trained language model; and the masked text is obtained by masking one or more words at a replacement position in the first text, and the replacement position is determined based on a replacement threshold of each word in the first text.

Optionally, in an embodiment, the replacement text of the first text is obtained by using a greedy algorithm and/or a beam search algorithm by inputting the masked text into the pre-trained language model.

Optionally, in an embodiment, the training text includes the label information, the teacher model is obtained by training an initial teacher model with the training text, and the student model is obtained by training an initial student model based on an initial sample semantic feature and an initial prediction semantic feature; and the initial sample semantic feature is output data that is of an intermediate layer of an initial teacher model and that is obtained by inputting initial training text into the initial teacher model, the prediction semantic feature is output data that is of an intermediate layer of the initial student model and that is obtained by inputting the initial training text into the initial student model, and the initial training text does not include label information.

Optionally, in an embodiment, the label information includes any one of information indicating a classification result of the training text, sequence tagging information, or text translation label information. The classification result includes an emotion classification result of the training text or a semantic intention classification result of the training text.

Optionally, in an embodiment, the initial teacher model and the initial student model are transformer models, the intermediate layer of the initial teacher model includes N transformer layers, and the intermediate layer of the initial student model includes M transformer layers; each of the M transformer layers includes an attention mechanism module and a forward network module; an $i^{th}$ transformer layer of the initial student model is obtained through training based on a sample semantic feature output by an $i^{th}$ transformer layer of M transformer layers of the initial teacher model and an attention score matrix in the attention mechanism module included in the $i^{th}$ transformer layer of the initial teacher model; and the M transformer layers of the initial teacher model are selected from the N transformer layers of the teacher model, where N is a positive integer greater than or equal to M, i is a positive integer less than or equal to M, and M is an integer greater than or equal to 1.

Optionally, in an embodiment, the processing result of the to-be-processed text is any one of the following processing results:

an emotion classification result of the to-be-processed text, a semantic intention classification result of the to-be-processed text, a sequence tagging result of the to-be-processed text, or a translation result of the to-be-processed text.

It should be noted that the training apparatus 900 and the text processing apparatus 1000 are embodied in a form of a functional unit. The term "unit" herein may be implemented in a form of software and/or hardware. This is not specifically limited.

For example, "unit" may be a software program, a hardware circuit, or a combination thereof that implements the foregoing functions. The hardware circuit may include an application-specific integrated circuit (application-specific integrated circuit, ASIC), an electronic circuit, a processor (for example, a shared processor, a dedicated processor, or a group processor) and a memory that are configured to execute one or more software or firmware programs, a merged logic circuit, and/or another suitable component that supports the described functions.

Therefore, the units in the examples described in the embodiments of this disclosure can be implemented through electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this disclosure.

Figure 18:
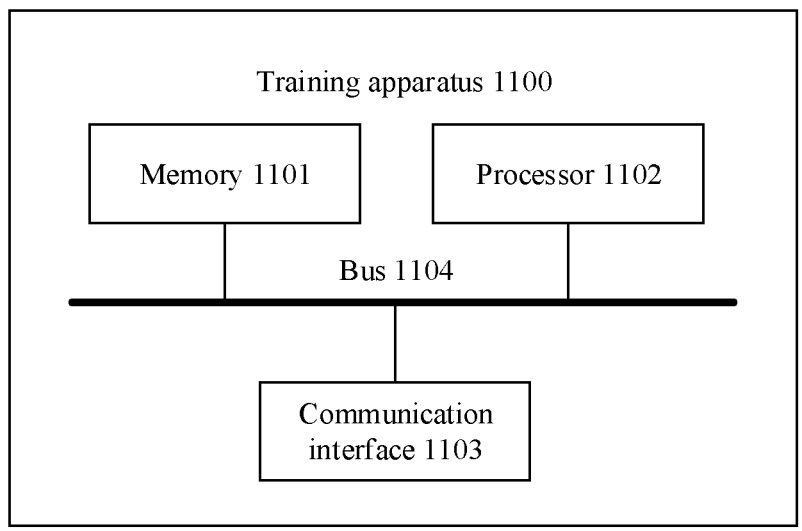
FIG. 18 is a schematic diagram of a text processing model training apparatus according to an embodiment of this disclosure.

FIG. 18 is a schematic diagram of a hardware structure of a text processing model training apparatus according to an embodiment of this disclosure. A training apparatus 1100 (the training apparatus 1100 may be specifically a computer device) shown in FIG. 18 includes a memory 1101, a processor 1102, a communication interface 1103, and a bus 1104. A communication connection is implemented between the memory 1101, the processor 1102, and the communication interface 1103 through the bus 1104.

The memory 1101 may be a read-only memory (read-only memory, ROM), a static storage device, a dynamic storage device, or a random access memory (random access memory, RAM). The memory 1101 may store a program. When the program stored in the memory 1101 is executed by the processor 1102, the processor 1102 is configured to perform the steps of the text processing model training method in the embodiments of this disclosure, for example, perform the steps shown in FIG. 8 to FIG. 14.

It should be understood that the training apparatus shown in this embodiment of this disclosure may be a server, for example, may be a server in a cloud, or may be a chip configured in a server in a cloud. Alternatively, the training apparatus shown in this embodiment of this disclosure may be an intelligent terminal, or may be a chip configured in the intelligent terminal.

The foregoing text processing model training method disclosed in the embodiments of this disclosure may be applied to the processor 1102, or implemented by the processor 1102. The processor 1102 may be an integrated circuit chip and has a signal processing capability. In an implementation process, steps of the foregoing text processing model training method may be performed through an integrated logic circuit of hardware in the processor 1102 or by using instructions in a form of software. For example, the processor 1102 may be a chip including the NPU shown in FIG. 6.

The processor 1102 may be a central processing unit (CPU), a graphics processing unit (GPU), a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams that are disclosed in the embodiments of this disclosure may be implemented or performed. The general-purpose processor may be a microprocessor, or the processor may be any conventional processor or the like. The steps of the methods disclosed with reference to the embodiments of this disclosure may be directly presented as being performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1101, and the processor 1102 reads instructions in the memory 1101, and completes, in combination with hardware of the processor 1102, a function that needs to be performed by a unit included in the training apparatus shown in FIG. 16 in the embodiments of this disclosure, or performs the training methods shown in FIG. 8 to FIG. 14 in the method embodiments of this disclosure.

A transceiver apparatus such as, but not limited to, a transceiver is used at the communication interface 1103, to implement communication between the apparatus 1100 and another device or a communication network.

The bus 1104 may include a channel that transmits information between various parts (for example, the memory 1101, the processor 1102, and the communication interface 1103) of the training apparatus 1100.

Figure 19:
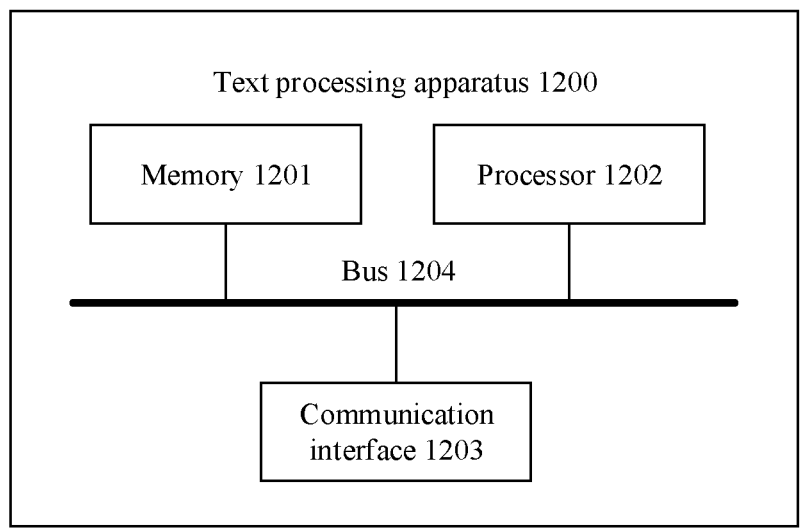
FIG. 19 is a schematic block diagram of a text processing apparatus according to an embodiment of this disclosure.

FIG. 19 is a schematic diagram of a hardware structure of a text processing apparatus according to an embodiment of this disclosure. A text processing apparatus 1200 (the text processing apparatus 1200 may be specifically a computer device) shown in FIG. 19 includes a memory 1201, a processor 1202, a communication interface 1203, and a bus 1204. A communication connection is implemented between the memory 1201, the processor 1202, and the communication interface 1203 are through the bus 1204.

The memory 1201 may be a read-only memory (ROM), a static storage device, a dynamic storage device, or a random access memory (random access memory, RAM). The memory 1201 may store a program. When the program stored in the memory 1201 is executed by the processor 1202, the processor 1202 is configured to perform the steps of the text processing method in the embodiments of this disclosure, for example, perform the steps shown in FIG. 15.

It should be understood that the text processing apparatus shown in this embodiment of this disclosure may be an intelligent terminal, or may be a chip configured in the intelligent terminal.

The foregoing text processing method disclosed in the embodiments of this disclosure may be applied to the processor 1202, or implemented by the processor 1202. The processor 1202 may be an integrated circuit chip and has a signal processing capability. In an implementation process, steps of the foregoing text processing method may be performed through an integrated logic circuit of hardware in the processor 1202 or by using instructions in a form of software. For example, the processor 1202 may be a chip including the NPU shown in FIG. 6.

The processor 1202 may be a central processing unit (CPU), a graphics processing unit (GPU), a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams that are disclosed in the embodiments of this disclosure may be implemented or performed. The general-purpose processor may be a microprocessor, or the processor may be any conventional processor or the like. The steps of the methods disclosed with reference to the embodiments of this disclosure may be directly presented as being performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1201, and the processor 1202 reads information in the memory 1201, and completes, in combination with hardware of the processor 1202, a function that needs to be performed by a unit included in the text processing apparatus shown in FIG. 17 in the embodiments of this disclosure, or performs the text processing method shown in FIG. 15 in the method embodiments of this disclosure.

A transceiver apparatus such as, but not limited to, a transceiver is used at the communication interface 1203, to implement communication between the apparatus 1200 and another device or a communication network.

The bus 1204 may include a channel that transmits information between various parts (for example, the memory 1201, the processor 1202, and the communication interface 1203) of the text processing apparatus 1200.

It should be noted that, although only the memory, the processor, and the communication interface are shown in each of the training apparatus 1100 and the text processing apparatus 1200, in a specific implementation process, a person skilled in the art should understand that the training apparatus 1100 and the text processing apparatus 1200 each may further include another component necessary for normal running. In addition, based on a specific requirement, a person skilled in the art should understand that the training apparatus 1100 and the text processing apparatus 1200 each may further include a hardware component for implementing another additional function. In addition, a person skilled in the art should understand that the training apparatus 1100 and the text processing apparatus 1200 each may include only components necessary for implementing the embodiments of this disclosure, but not necessarily include all the components shown in FIG. 18 or FIG. 19.

An embodiment of this disclosure further provides a chip, where the chip includes a transceiver unit and a processing unit. The transceiver unit may be an input/output circuit or a communication interface. The processing unit may be a processor, a microprocessor, or an integrated circuit, integrated on the chip. The chip may perform the method in the foregoing method embodiments.

An embodiment of this disclosure further provides a computer-readable storage medium. The computer-readable storage medium stores instructions. When the instructions are executed, the method in the foregoing method embodiments is performed.

An embodiment of this disclosure further provides a computer program product including instructions. When the instructions are executed, the method in the foregoing method embodiments is performed.

It should be further understood that, in the embodiments of this disclosure, the memory may include a read-only memory and a random access memory, and provide instructions and data for the processor. A part of the processor may further include a non-volatile random access memory. For example, the processor may further store information of a device type.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of the embodiments of this disclosure.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function modules in the embodiments of this disclosure may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this disclosure. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A text processing model training method performed by a processor, comprising:
   performing partial word replacement on an obtained original text set to obtain a replacement text set, the performing partial word replacement comprising:
      obtaining first text, wherein the first text is any text in the original text set;
      determining a replacement position of a word in the first text based on a replacement threshold of each word in the first text;
      masking one or more words at the replacement position to generate masked text; and
      inputting the masked text into a pre-trained language model to obtain replacement text of the first text;
   obtaining an enhanced text set based on the original text set and the replacement text set, wherein each piece of training text in the enhanced text set comprises label information, and the label information comprises any one of information indicating a classification result of the training text, sequence tagging information, or text translation label information; and the classification result comprises an emotion classification result of the training text or a semantic intention classification result of the training text, wherein the enhanced text set serves as a training text;
   separately processing the training text using a teacher model and a student model to obtain sample data output by the teacher model and prediction data output by the student model, wherein the teacher model and the student model each comprise an input layer, one or more intermediate layers, and an output layer; the sample data comprises a sample semantic feature output by the intermediate layer of the teacher model and a sample label output by the output layer of the teacher model; the prediction data comprises a prediction semantic feature output by the intermediate layer of the student model and a prediction label output by the output layer of the student model; and the teacher model is a pre-trained model used for text processing; and
   training a model parameter of the student model based on the sample data and the prediction data, to obtain a target student model.

2. The training method according to claim 1, wherein the training the model parameter of the student model based on the sample data and the prediction data comprises:
   training the intermediate layer of the student model based on the sample semantic feature and the prediction semantic feature; and
   training the output layer of the student model based on the sample label and the prediction label.

3. The training method according to claim 2, wherein the teacher model and the student model are transformer models, the intermediate layer of the teacher model comprises N transformer layers, and the intermediate layer of the student model comprises M transformer layers; N is a positive integer greater than or equal to M, and the training the intermediate layer of the student model based on the sample semantic feature and the prediction semantic feature comprises:
   selecting M transformer layers from the N transformer layers comprised in the teacher model, wherein each of the M transformer layers comprises an attention mechanism module and a forward network module; and
   training an $i^{th}$ transformer layer of the student model based on both a sample semantic feature output by an $i^{th}$ transformer layer of the M transformer layers of the teacher model and an attention score matrix in the attention mechanism module comprised in the $i^{th}$ transformer layer of the teacher model, wherein i is a positive integer less than or equal to M, and M is an integer greater than or equal to 1.

4. The training method according to claim 1, wherein the inputting the masked text into the pre-trained language model to obtain replacement text of the first text comprises:
  inputting the masked text into the pre-trained language model to obtain the replacement text of the first text by using a greedy algorithm and/or a beam search algorithm.

5. The training method according to claim 1, wherein the training text comprises the label information, the teacher model is obtained by training an initial teacher model with the training text, and before the training text is obtained, the method further comprises:
  obtaining initial training text, wherein the initial training text does not comprise label information;
  separately inputting the initial training text into the initial teacher model and an initial student model to obtain an initial sample semantic feature output by an intermediate layer of the initial teacher model and an initial prediction semantic feature output by an intermediate layer of the initial student model; and
  training a model parameter of the initial student model based on the initial sample semantic feature and the initial prediction semantic feature, to obtain the student model.

6. The training method according to claim 5, wherein the initial teacher model and the initial student model are transformer models, the intermediate layer of the initial teacher model comprises N transformer layers, and the intermediate layer of the initial student model comprises M transformer layers; N is a positive integer greater than or equal to M, and the training a model parameter of the initial student model based on the initial sample semantic feature and the initial prediction semantic feature comprises:
  selecting M transformer layers from the N transformer layers comprised in the initial teacher model, wherein each of the M transformer layers comprises an attention mechanism module and a forward network module; and
  training an $i^{th}$ transformer layer of the initial student model based on both a sample semantic feature output by an $i^{th}$ transformer layer of the M transformer layers of the initial teacher model and an attention score matrix in the attention mechanism module comprised in the $i^{th}$ transformer layer of the initial teacher model, wherein i is a positive integer less than or equal to M, and M is an integer greater than or equal to 1.

7. A text processing method performed by a processor, comprising:
  obtaining to-be-processed text; and
  processing the to-be-processed text using a target student model to obtain a processing result of the to-be-processed text, wherein:
  the target student model is obtained by training a student model based on sample data and prediction data, the sample data is obtained based on training text and a teacher model, and the prediction data is obtained based on the training text and the student model; the teacher model and the student model each comprise an input layer, one or more intermediate layers, and an output layer; the sample data comprises a sample semantic feature output by the intermediate layer of the teacher model and a sample label output by the output layer of the teacher model; the prediction data comprises a prediction semantic feature output by the intermediate layer of the student model and a prediction label output by the output layer of the student model; and the teacher model is a pre-trained model used for text processing, the training text is an enhanced text set, each piece of training text in the enhanced text set comprises label information, and the label information comprises any one of information indicating a classification result of the training text, sequence tagging information, or text translation label information; the classification result comprises an emotion classification result of the training text or a semantic intention classification result of the training text; and the enhanced text set is obtained based on an obtained original text set and a replacement text set, and the replacement text set is obtained by performing partial word replacement on the original text set, and the replacement text set comprises replacement text of first text, the first text is any text in the original text set, and the replacement text of the first text is obtained by inputting masked text into a pre-trained language model; and the masked text is obtained by masking one or more words at a replacement position in the first text, and the replacement position is determined based on a replacement threshold of each word in the first text.

8. The text processing method according to claim 7, wherein an intermediate layer of the target student model is obtained through training based on the sample semantic feature and the prediction semantic feature; and an output layer of the target student model is obtained through training based on the sample label and the prediction label.

9. The text processing method according to claim 7, wherein the teacher model and the student model are transformer models, the intermediate layer of the teacher model comprises N transformer layers, and the intermediate layer of the student model comprises M transformer layers; each of the M transformer layers comprises an attention mechanism module and a forward network module; an $i^{th}$ transformer layer of the target student model is obtained through training based on both a sample semantic feature output by an $i^{th}$ transformer layer of M transformer layers of the teacher model and an attention score matrix in the attention mechanism module comprised in the $i^{th}$ transformer layer of the teacher model; and the M transformer layers of the teacher model are selected from the N transformer layers of the teacher model, wherein N is a positive integer greater than or equal to M, i is a positive integer less than or equal to M, and M is an integer greater than or equal to 1.

10. The text processing method according to claim 7, wherein the replacement text of the first text is obtained by using a greedy algorithm and/or a beam search algorithm by inputting the masked text into the pre-trained language model.

11. The text processing method according to claim 7, wherein the training text comprises the label information, the teacher model is obtained by training an initial teacher model with the training text, and the student model is obtained by training an initial student model based on an initial sample semantic feature and an initial prediction semantic feature; and the initial sample semantic feature is output data that is of an intermediate layer of the initial teacher model and that is obtained by inputting initial training text into the initial teacher model, the prediction semantic feature is output data that is of an intermediate layer of the initial student model and that is obtained by inputting the initial training text into the initial student model, and the initial training text does not comprise label information.

12. The text processing method according to claim 11, wherein the initial teacher model and the initial student model are transformer models, the intermediate layer of the initial teacher model comprises N transformer layers, and the intermediate layer of the initial student model comprises M transformer layers; each of the M transformer layers comprises an attention mechanism module and a forward network module; an $i^{th}$ transformer layer of the initial student model is obtained through training based on both a sample semantic feature output by an $i^{th}$ transformer layer of M transformer layers of the initial teacher model and an attention score matrix in the attention mechanism module comprised in the $i^{th}$ transformer layer of the initial teacher model; and the M transformer layers of the initial teacher model are selected from the N transformer layers of the initial teacher model, wherein N is a positive integer greater than or equal to M, i is a positive integer less than or equal to M, and M is an integer greater than or equal to 1.

13. The text processing method according to claim 7, wherein the processing result of the to-be-processed text is any one of the following processing results:

an emotion classification result of the to-be-processed text, a semantic intention classification result of the to-be-processed text, a sequence tagging result of the to-be-processed text, or a translation result of the to-be-processed text.

14. A text processing apparatus, comprising:

a memory, configured to store a program; and a processor, configured to execute the program stored in the memory, wherein when the processor executes the program stored in the memory, the processor is configured to perform:

obtaining to-be-processed text; and processing the to-be-processed text using a target student model to obtain a processing result of the to-be-processed text, wherein the target student model is obtained by training a student model based on sample data and prediction data, the sample data is obtained based on training text and a teacher model, and the prediction data is obtained based on the training text and the student model; the teacher model and the student model each comprise an input layer, one or more intermediate layers, and an output layer; the sample data comprises a sample semantic feature output by the intermediate layer of the teacher model and a sample label output by the output layer of the teacher model; the prediction data comprises a prediction semantic feature output by the intermediate layer of the student model and a prediction label output by the output layer of the student model; and the teacher model is a pre-trained model used for text processing, the training text is an enhanced text set, each piece of training text in the enhanced text set comprises label information, and the label information comprises any one of information indicating a classification result of the training text, sequence tagging information, or text translation label information; the classification result comprises an emotion classification result of the training text or a semantic intention classification result of the training text; and the enhanced text set is obtained based on an obtained original text set and a replacement text set, and the replacement text set is obtained by performing partial word replacement on the original text set, and the replacement text set comprises replacement text of first text, the first text is any text in the original text set, and the replacement text of the first text is obtained by inputting masked text into a pre-trained language model; and the masked text is obtained by masking one or more words at a replacement position in the first text, and the replacement position is determined based on a replacement threshold of each word in the first text.

15. A non-transitory computer-readable storage medium, wherein the computer-readable storage medium stores program instructions, and when the program instructions are run on a processor, the processor is configured to perform:

obtaining to-be-processed text; and processing the to-be-processed text using a target student model to obtain a processing result of the to-be-processed text, wherein the target student model is obtained by training a student model based on sample data and prediction data, the sample data is obtained based on training text and a teacher model, and the prediction data is obtained based on the training text and the student model; the teacher model and the student model each comprise an input layer, one or more intermediate layers, and an output layer; the sample data comprises a sample semantic feature output by the intermediate layer of the teacher model and a sample label output by the output layer of the teacher model; the prediction data comprises a prediction semantic feature output by the intermediate layer of the student model and a prediction label output by the output layer of the student model; and the teacher model is a pre-trained model used for text processing, the training text is an enhanced text set, each piece of training text in the enhanced text set comprises label information, and the label information comprises any one of information indicating a classification result of the training text, sequence tagging information, or text translation label information; the classification result comprises an emotion classification result of the training text or a semantic intention classification result of the training text; and the enhanced text set is obtained based on an obtained original text set and a replacement text set, and the replacement text set is obtained by performing partial word replacement on the original text set, and the replacement text set comprises replacement text of first text, the first text is any text in the original text set, and the replacement text of the first text is obtained by inputting masked text into a pre-trained language model; and the masked text is obtained by masking one or more words at a replacement position in the first text, and the replacement position is determined based on a replacement threshold of each word in the first text.

* * * * *